US010007521B1

United States Patent
Tam et al.

(10) Patent No.: US 10,007,521 B1
(45) Date of Patent: *Jun. 26, 2018

(54) BANKED PHYSICAL REGISTER DATA FLOW ARCHITECTURE IN OUT-OF-ORDER PROCESSORS

(71) Applicant: Marvell International Ltd., Hamilton (BM)

(72) Inventors: Kit Sang Tam, Menlo Park, CA (US); Winston Lee, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 200 days.

This patent is subject to a terminal disclaimer.

(21) Appl. No.: 15/051,465

(22) Filed: Feb. 23, 2016

Related U.S. Application Data

(63) Continuation-in-part of application No. 14/137,519, filed on Dec. 20, 2013, now Pat. No. 9,652,246.

(60) Provisional application No. 62/119,598, filed on Feb. 23, 2015, provisional application No. 61/740,336, filed on Dec. 20, 2012.

(51) Int. Cl.
*G06F 9/38* (2018.01)
(52) U.S. Cl.
CPC .................. *G06F 9/3804* (2013.01)
(58) Field of Classification Search
None
See application file for complete search history.

(56) References Cited

U.S. PATENT DOCUMENTS

| 5,805,849 | A | * | 9/1998 | Jordan | G06F 9/3836 712/214 |
| 5,850,533 | A | * | 12/1998 | Panwar | G06F 9/3836 712/216 |
| 5,872,950 | A | | 2/1999 | Levitan et al. | |
| 5,903,918 | A | | 5/1999 | Bauman et al. | |
| 5,978,898 | A | | 11/1999 | Hathaway et al. | |
| 6,167,497 | A | | 12/2000 | Nakatsuka et al. | |
| 6,625,746 | B1 | * | 9/2003 | Moore | G06F 9/3802 712/205 |

(Continued)

OTHER PUBLICATIONS

"Dynamic Scheduling—Tomasulo's Algorithm," accessed at http://www.cs.umd.edu/class/fall2001/cmsc411/projects/dynamic/tomasulo.html on Oct. 21, 2014 (2 pages).

(Continued)

*Primary Examiner* — Eric Coleman

(57) ABSTRACT

Instructions to be executed by a processing system are fetched from a memory. Respective age tags are assigned to the instructions such that each of the age tags indicates an age of the corresponding instruction in the processing system. A respective physical register is allocated to each destination logical register referenced by each instruction. The respective age tags assigned to the instructions are written to respective physical registers allocated to the destination logical registers of the instructions, and to a buffer configured to maintain a program order of the instructions. The instructions are executed by the processing system. Executing the instructions includes executing at least some of the instructions in an order different from the program order of the instructions. The age tags in the buffer are used to retire executed instructions in a same order as the program order of the instructions.

20 Claims, 23 Drawing Sheets

(56) References Cited

U.S. PATENT DOCUMENTS

| | | | | |
|---|---|---|---|---|
| 6,785,802 B1* | 8/2004 | Roy | ................... | G06F 9/3836 |
| | | | | 712/216 |
| 9,304,777 B1* | 4/2016 | Schuttenberg | ........ | G06F 9/3836 |
| 2005/0273579 A1 | 12/2005 | Elmer | | |
| 2008/0082792 A1 | 4/2008 | Vincent et al. | | |
| 2010/0145969 A1* | 6/2010 | Wang | ................... | G06F 9/38 |
| | | | | 707/758 |
| 2010/0332804 A1* | 12/2010 | Golla | ................... | G06F 9/3838 |
| | | | | 712/214 |
| 2010/0333098 A1* | 12/2010 | Jordan | ................... | G06F 9/384 |
| | | | | 718/103 |
| 2011/0185159 A1* | 7/2011 | Bishop | ................. | G06F 9/3855 |
| | | | | 712/208 |
| 2012/0124589 A1* | 5/2012 | Rupley | ................... | G06F 9/46 |
| | | | | 718/103 |
| 2012/0233442 A1* | 9/2012 | Shah | ................... | G06F 9/3806 |
| | | | | 712/207 |

OTHER PUBLICATIONS

Tomasulo, R.M., "An Efficient Algorithm for Exploiting Multiple Arithmetic Units," IBM Journal, pp. 25-33 (Jan. 1967).

U.S. Appl. No. 14/137,519, Tam et al., "Banked Physical Register Data Flow Architecture in Out-of-Order Processors," filed Dec. 20, 2013.

* cited by examiner

BANKED PHYSICAL REGISTER DATA FLOW ARCHITECTURE IN OUT-OF-ORDER PROCESSORS

CROSS-REFERENCE TO RELATED APPLICATION

This application is a continuation-in-part of U.S. patent application Ser. No. 14/137,519, entitled "Banked Physical Register Data Flow Architecture in Out-of-Order Processors," filed on Dec. 20, 2013, which claims the benefit of U.S. Provisional Patent Application No. 61/740,336, entitled "BPRDF Architecture," filed on Dec. 20, 2012. Additionally, this application claims the benefit of U.S. Provisional Patent Application No. 62/119,598, entitled "BPRDF Architecture," filed on Feb. 23, 2015. All of the applications referenced above are hereby incorporated by reference herein in their entireties.

FIELD OF THE DISCLOSURE

The present disclosure relates generally to processor architectures, and more particularly to out-of-order processor architectures.

BACKGROUND

Single threaded processing systems are commonly employed by processing units, such as central processing units (CPU) and other general purpose and/or specialized microprocessor systems. To increase single thread performance of such processing units, clock frequency at which the processing units operate can be increased. In addition to, or instead of, increasing the clock frequency, instruction issue width employed by the processing units can be increased, allowing the processing units to execute more instructions in a single clock cycle. However, increasing the clock frequency and/or increasing the issue width of a processing unit typically results in a significant increase of the size of the processing unit and a significant increase of power dissipation of the processing unit.

SUMMARY

In an embodiment, a method of executing instructions in a processing system includes fetching one or more instructions to be executed by the processing system. The method also includes assigning respective age tags to each of the one or more instructions, wherein each of the age tags indicates an age of the corresponding instruction in the processing system. The method further includes allocating, to each destination logical register referenced by each instruction, respective physical registers in a physical register file, and writing the respective age tags assigned to the instructions to (i) respective physical registers allocated to the destination logical registers of the instructions and (ii) a buffer configured to maintain a program order of the instructions. The method further still includes executing at least some of the instructions in an order different from the program order of the instructions. The method additionally includes retiring, using the age tags in the buffer, the executed instructions from the processing system in a same order as the program order of the instructions.

In another embodiment, a processing system comprises an instruction execution hardware module configured to execute instructions fetched from a memory. The processing system also includes an instruction issue hardware module configured to assign respective age tags to each of the instructions fetched from the memory, wherein each age tags indicates an age of the corresponding instruction in the processing system. The instruction issue hardware module is further configured to allocate, to each destination logical register referenced by each instruction, a respective physical register in a physical register file, and write the respective age tags assigned to the instructions to (i) respective physical registers allocated to the destination logical registers of the instructions and (ii) a buffer configured to maintain a program order of the instructions. The processing system is configured to execute at least some of the instructions in an order different from the program order of the instructions, and use the age tags in the buffer to retire instructions from the processing system in a same order as the program order of the instructions.

DETAILED DESCRIPTION

Figure 1:
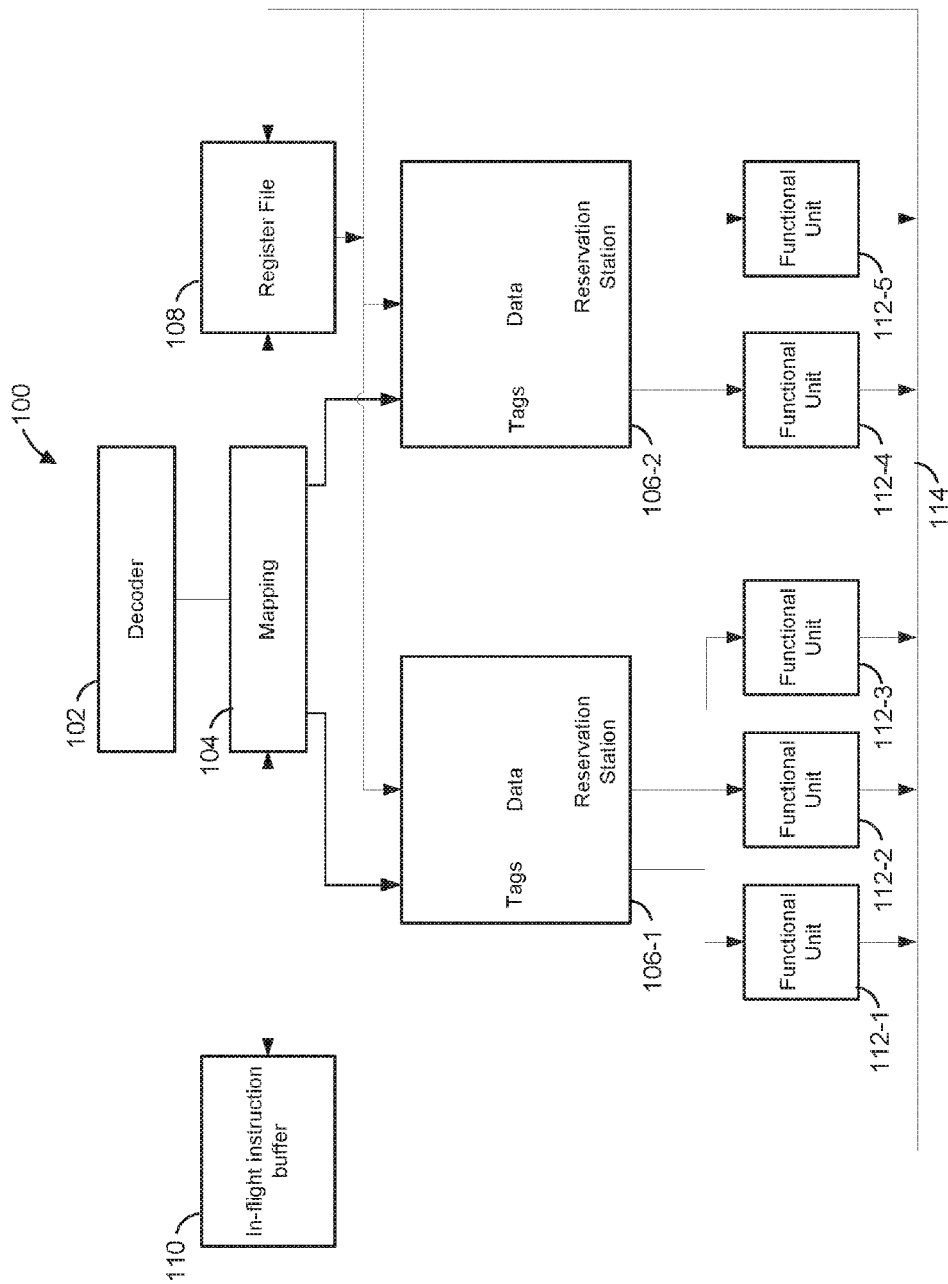
FIG. 1 is a block diagram of an example processing system, according to an embodiment of the present disclosure.

FIG. 1 is a block diagram of an example processing system 100, according to an embodiment of the present disclosure. In an embodiment, the processing system 100 includes one or more integrated circuits (ICs) configured to operate as discussed below. In an embodiment, the processing system 100 is part of an out of order (OOO) processor configured to execute at least some instructions in an order different from the program order of the instructions. The processing system 100 operates according to the known Tomasulo's algorithm for out of order execution of instructions, in an embodiment. The processing system 100 operates in other suitable manners to execute out of order instructions, in other embodiments. The out of order out of order execution of instructions generally reduces or eliminates stall times encountered by the processing system 100, in at least some embodiments. According to an embodiment, when the processing system 100 stalls on a first instruction, for example when data needed for execution of the first instruction (e.g., one or more operands of the first instruction) are not yet produced by a pervious instruction, the processing system 100 looks ahead in a set of instructions, selects an instruction for which all necessary data is available, and executes the selected instruction. Then, in an embodiment, when the necessary data becomes available for the first instruction, the processing system 100 executes the first instruction. In an embodiment, although at least some instructions in a set of instructions are executed in an order different form the program order of the instructions, the processing system 100 is configured to retire the instructions from the processing system 100, and to reclaim resources that were used for executing the instructions by the processing system 100, according to the program order of the instructions. In various embodiments described below, to efficiently keep track of program order of the instructions currently being executed (and/or queued for subsequent execution) by the processing system 100 ("in-flight instructions"), the processing system 100 assigns global age tags to the instructions, wherein the global age tags indicate the program order of the instructions (i.e., the order in which the instructions appear in the program being executed), and utilizes the global age tags for performing various operations with respect to the instructions, such as maintaining program order of the instructions when retiring the instructions, data forwarding for execution of instructions, write-back of results of execution of the instructions, scheduling execution of the instructions, etc.

In some embodiments, the processing system 100 is configured to execute multiple instructions simultaneously (e.g., during a single clock cycle). Executing multiple instructions during a single clock cycle generally increases performance of the processing system 100, for example by increasing the number of millions of instructions per second (MIPS) executed by the processing system 100 and/or increasing the number of program iterations per second ("Dhrystone number") executed by the processing system 100. As will be explained in more detail below, the various architectures of the present disclosure allow the processing system 100 to increase the number of instructions executed per clock cycle by the processing system 100, i.e. to increase "issue width" of the processing system 100, without significantly increasing area occupied by the processing system 100 and without significantly increasing power dissipation of the processing system 100, in at least some embodiments. Also, the various architectures of the present disclosure allow the processing system 100 to increase the issue width of the processing system 100 without significantly impacting logic complexity of various elements of the processing system 100, in at least some embodiments.

The processing system 100 includes a decoder unit 102 coupled to a mapping unit 104. The mapping unit 104 is coupled to a plurality of reservation stations 106, a physical register file 108 and an in-flight instruction buffer 110. Each of the reservation stations 106 is coupled to one or multiple functional units 112. The functional units 112 are configured to execute various instructions, in an embodiment. For example, the functional units 112-1 through 112-3 are arithmetic and logic units (ALU), such as adders or multipliers, the functional unit 112-4 is a load unit, the functional unit 112-3 is a load and store unit, etc. A common bus 114 connects respective outputs of the functional units 112 to the physical register file 108 for writing the operation results of the instructions back to the physical register file 108. The common bus 114 also couples the respective outputs of the functional units 112 to the reservation stations 106 for forwarding of the results of the instructions to the reservation stations 106 that may need the results for executing subsequent instructions queued by the reservation stations 106 ("data forwarding"), and to the in-flight instruction buffer 110 for providing status updates (e.g., for completed instructions) to the in-flight instruction buffer 110, in an embodiment.

Although two reservation stations 106 are illustrated in FIG. 1, the processing system 100 includes other suitable numbers (e.g., 1, 3, 4, 5, 6, etc.) of reservation stations 106, in other embodiments. Similarly, although five functional units 112 are illustrated in FIG. 1, the processing system 100 includes other suitable numbers of functional units 112, in other embodiments. Further, in various embodiments, each of the reservation stations 106 is coupled to any suitable number of functional units 112. For example, each of the reservation stations 106 is coupled to respective two function units 112, in an embodiment. As just another example, the reservation stations 106-1 is coupled to only one functional unit 112, while the reservation station 106-2 is coupled to multiple (e.g., 2, 3, 4, 5, 6, etc.) functions units 112, in another embodiment.

Generally speaking, the physical register file 108 comprises a plurality of physical registers used for temporary storage of values of various registers referenced by instructions being executed by the processing system 100. In an embodiment, the number of physical registers contained the physical register file 108 exceeds the number of logical, or architectural, registers defined by an instruction set architecture (ISA) being implemented by the processing system 100. In an embodiment, the mapping unit 104 is configured to map architectural registers referenced by the instructions being processed to the physical registers in the physical register file 108. Suitably mapping the logical registers referenced by the instructions to the physical registers in the physical register file 108 decouples the instructions and removes unnecessary dependencies between the instructions to allow out of order execution of such instructions, in an embodiment.

As will be described in more detail below, in some embodiments, the physical register file 108 is organized as a plurality of register banks. For example, in one such embodiment, the physical register file 108 includes a respective physical register bank corresponding to each architectural register defined by the instruction set architecture (ISA) supported by the processing system 100. As just an example, the processing system 100 supports a 16-register ISA, such as a 16-register ARM ISA, and the physical register file 108 includes 16 register banks, with each register bank corresponding to a respective one of the architectural registers defined by the ISA, in an embodiment. The mapping unit 104 is configured to map a logical register to a physical register in the register bank corresponding to the logical register in the physical register file 108, in an embodiment.

In operation, an instruction fetched by the processing system 100 is provided to the decoder unit 102. The decoder unit 102 decodes the instruction and provides the decoded instruction to the mapping unit 104. The mapping unit 104 assigns a global age tag to the instruction. The global age tag represents an age of the instruction in the processing system 100 and, accordingly, represents an order of the instruction in the program code being executed by the processing unit 100, in an embodiment. In an embodiment, the global age tag comprises ten bits. In another embodiment, the global age tag comprises another suitable number of bits (e.g., 1, 2, 3, 4, 5, 6, 7, 8, 9, 11, 12, 13, etc. bits).

The mapping unit 104 applies register renaming to the instruction to appropriately map architectural registers referenced by the instruction to the physical registers contained in the physical register file 108, in an embodiment. Generally speaking, the instruction indicates one or more registers respectively corresponding to one or more operands of the instructions, and a destination register corresponding to the result of the instructions. The mapping unit 104 is configured to re-name or map at least the destination register of the instruction to a particular physical register in the physical register file 108 to avoid certain data hazards, such as write-after-read (WAR) data hazards that may result in at least some situations in which instructions that reference a same logical destination register are executed out of order, in an embodiment. Further, if the instruction includes an operand register corresponding to a previously re-named destination register of a previous instruction, the mapping unit 104 re-names or maps this operand register with the new name of the destination register of the previous instruction to allow correct operand data to be subsequently obtained for the instruction, in an embodiment.

The mapping unit 104 writes the global age tag, assigned to the instruction, to the mapped register, in the physical register file 108, corresponding to the destination register of the instruction, and issues the instruction to an appropriate reservation station 106 for subsequent execution of the instruction. In an embodiment, when the mapping unit 104 issues the instruction to a reservation station 106, the mapping unit 104 also provides the global age tag assigned to the instruction to the reservation station 106. Further, the mapping unit 104 provides the instruction and the global age tag assigned to the instruction to the in-flight buffer 110.

The reservation station 106 receives the instruction, along with the global age tag assigned to the instruction, from the mapping unit 104, and accesses the register file 108 to obtain contents of the physical registers corresponding to the one or more operands of the instruction. The physical registers contain either the value of the operand of the instruction, or, if a value of an operand of the instruction is not yet available, the corresponding physical register contains the global age tag of the instruction that will subsequently produce the operand value. The reservation station 106 suitably associates the instruction, the global age tag of the instruction, and the register contents obtained for the instruction from the register file 108, for example by storing such associations in a table or a database that queues the instructions issued to the reservation station 106. If not all of the operands of the instruction are available at issue of the instruction, the reservation station 106 listens on the common bus 114 for the global age tag (or tags) obtained for the operands of the instruction from the register file 108, in an embodiment. Once a value for an operand becomes available on the common bus 114, the reservation station 106 obtains the value from the common bus 114 and associates the value with the instruction (e.g., replaces the global age tag obtained for the operand from the register file 108 with the value for the operand obtained from the common bus 114). The common bus 114 also provides the value to the register file 108, and the global age tag corresponding to the instruction that produced the value is overwritten with the actual value produced by the instruction, in an embodiment.

Once all of the operands of an instruction are available to the reservation station 106, the reservation station 106 schedules the instruction for execution by an appropriate functional unit 112 coupled to the reservation station 106. In an embodiment, the reservation station 106 provides the one or more operands of the instruction and the re-named destination register of the instruction to the appropriate functional unit 112 that will execute the instruction. The functional unit 112 executes the instruction and writes the result of the instruction to the re-named destination register in the physical register file 108. The functional unit 112 also provides the result of the instruction to the common bus 112 to make the result of the instruction available to a reservation station 106 that may be waiting for the result of the instruction (e.g., a reservation station is listening on the common bus 112 for a global age tag associated with the present instruction) for executing a subsequent instruction, in an embodiment. Additionally, the result of the instruction and the global age tag associated with the instruction is provided via the common bus 114 to the in-flight instruction buffer 110 to indicate to the instruction buffer 110 that the instruction is completed, in an embodiment.

The in-flight instruction buffer 110 ensures that in-flight instructions are retired from the processing system 100 in the order in which the instructions appear in the program being executed, in an embodiment. The in-flight instruction buffer 110 generally keeps track of states of current in-flight instructions in the processing system 100, and retires an instruction, or a set of instructions, when all previous instruction have been completed by the processing system 100. Because the instruction buffer 110 buffers the respective global age tags associated with the instructions, the instruction buffer 110 is capable of efficiently retiring a completed instruction, or a set of completed instructions having consecutive global age tags, by detecting that no in-flight instructions having earlier global age tags are present in the processing system 100, in an embodiment.

When instructions are retired from the processing system 100, resources used for execution of the instructions (e.g., physical registers associated with the instructions) are de-allocated and are made available for execution of subsequent instructions, in an embodiment. In an embodiment, the in-flight instruction buffer 110 notifies the mapping unit 104 of a retired instruction or a set of retired instructions. In an embodiment, the mapping unit 104 simultaneously de-allocates resources (e.g., the physical registers) previously allocated to each instruction in the set of retired instructions by using the global age tags associated with the instructions, as will be explained in more detail below. The global age tags associated with the retired instructions become available to be subsequently reused by other instructions, in an embodiment.

The various blocks, such as the various the various units, modules, buffers, memories, etc, described with respect to FIG. 1 are implemented using hardware, in an embodiment. For example, the various blocks, such as the various units, modules, buffers, memories, etc. are hardware blocks, such as hardware units, modules, buffers, memories, etc., implemented using one or more ICs, in an embodiment. As an example, the register file 108 is implemented on a first IC, the in-flight instruction buffer 110 is implemented on a second ICs, and units 102, 104, 106, 112, and the common bus 114 are implemented on a third IC, in an embodiment. As another example, at least a portion of the register file 108 and/or at least a portion of the in-flight instruction buffer 110 are implemented on a same IC as the units 102, 104, 106, 112, and the common bus 114, in an embodiment.

Figure 2:
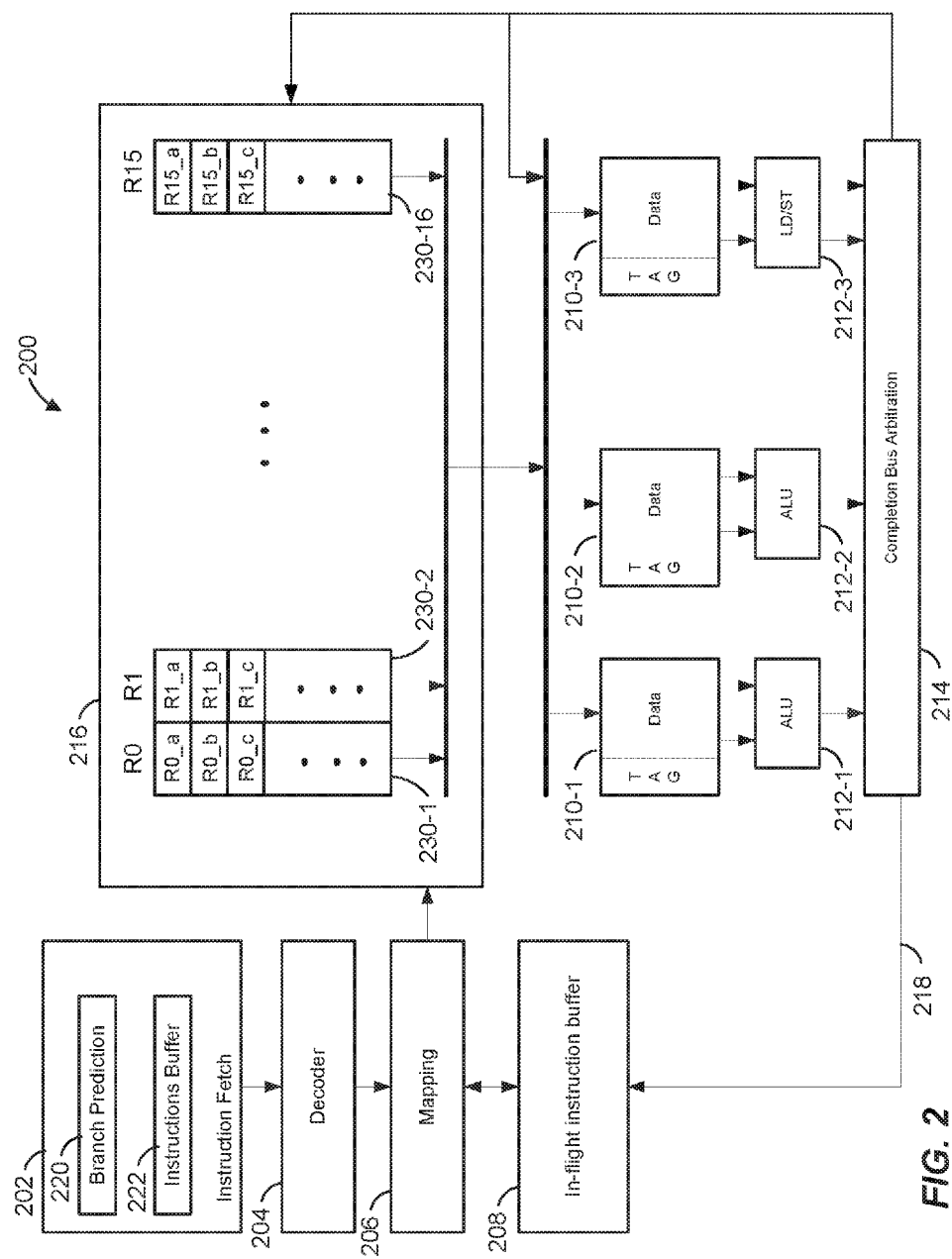
FIG. 2 is a block diagram illustrating a processing system, according to another embodiment.

FIG. 2 is a block diagram illustrating a processing system 200, according to another embodiment. In an embodiment, the processing system 100 includes one or more ICs configured to operate as discussed below. The processing system 200 is generally similar to the processing system 100 of FIG. 1. The processing system 200 includes an instruction fetch unit 202 coupled to a decoder unit 204. The decoder unit 204 is coupled to a mapping unit 206. The mapping unit 206 is, in turn, coupled to an in-flight instruction buffer 208, a plurality of reservation stations 210, and a physical register file 216. The reservation stations 210 are coupled to functional units 212 and are configured to cause execution of the instructions by the function unit 212. The respective outputs of the functional units 212 are coupled, via a completion bus arbitration unit 214, to a common bus 218.

With continued reference to FIG. 2, in an embodiment, the instruction fetch unit 202 includes a branch predication unit 220 and an instruction buffer 222. Generally speaking, the instruction fetch unit 202 retrieves instructions from a memory (not shown) and stores the fetched instructions in the instructions buffer 222. In an embodiment, when the program being executed encounters a conditional statement, such as an if-then statement, the branch prediction unit 222 of the instruction fetch unit 202 predicts which branch the program will take, before the statement is actually executed by the processing system 200, and the instruction fetch unit 202 continues fetching the instructions by retrieving the instructions corresponding to the predicated branch. The instruction buffer 220 queues the fetched instructions according to the program order of the instructions, in an embodiment. The instruction fetch unit 202 provides the instructions queued in the instruction buffer 220, in the program order of the instructions, to the decoder unit 204. Depending on the issue width of the processing system 200, one or several instructions are provided to the decoder unit 204 in a single clock cycle, in various embodiments.

The decoder unit 204 decodes the instructions and provides the decoded instructions to the mapping unit 206. According to an embodiment, the mapping unit 206 operates as described above with respect to the mapping unit 104 of FIG. 1 to map logical registers referenced by the instructions to physical registers of the physical register file 216. In the embodiment of FIG. 2, the physical register file 216 is partitioned into a plurality of register banks 230. In an embodiment, the number of physical register banks 230 corresponds to the number of logical registers supported by the ISA supported by the processing system 200. In the embodiment of FIG. 2, the processing system 200 supports a 16-logical register ISA, and the physical register file 216 includes 16 register banks 230. In an embodiment, each of the register banks 230 is a dual port memory having one read port and one write port ("1R1W port memory"). In this embodiment, each of the register banks 230 includes a respective single read port and a respective single write port. In an embodiment, each of the register banks 230 is configured as a respective queue of registers, such as an ordered circular queue of registers. In an embodiment, a queue of registers of a register bank 230 is configured to queue values of a particular logical register produced by execution of the in-flight instructions that reference the particular logical register.

As described above, in an embodiment, the decoder unit 204 provides the decoded instructions to the mapping unit 206 according to the program order of the instructions. The mapping unit 206 processes the decoded instructions in the program order of the instructions, in this embodiment. The mapping unit 206 assigns, to each instruction, a global age tag that indicates the age of the instruction in the system 200 and, accordingly, indicates the program order of the instruction. The mapping unit 206 also re-names or maps at least the destination logical registers of the instructions to allocated physical registers in the physical register file 216 to the destination logical registers of the instructions. In an embodiment, the mapping unit 206 is configured to map logical destination register referenced by the instructions to registers in respective register banks 230 corresponding to the destination logical registers. Thus, for example, every time the mapping unit 206 encounters a logical destination register R0, the mapping unit 206 maps the logical destination register R0 to an available physical register in the register bank 230-1 which corresponds to the logical register R0. Similarly, every time the mapping unit 206 encounters a logical destination register R1, the mapping unit 206 maps the logical destination register R0 to an available physical register in the register bank 230-2 which corresponds to the logical register R1, and so on, in an embodiment. A specific example register renaming scheme employed by the mapping unit 206, according to an example embodiment, is described below with respect to FIG. 3.

In an embodiment in which the register banks 230 are configured as respective register queues, the mapping unit 206 maintains indications, such as pointers, to respective heads and tails of the queues. In an embodiment, the mapping unit 206 maps a logical register to a corresponding register bank in the physical register file 202 by mapping the logical register to a register immediately following the tail of the queue. For example, to map a logical register to a physical register in a register bank 230, the mapping unit 206 increments the corresponding indication (e.g., pointer) of the current tail of the corresponding queue to the next register location in the queue, and allocates the next register location to the logical register being mapped by the mapping unit 206.

In an embodiment, the mapping unit 206 writes the global age tags assigned to the instructions to the allocated destination registers of the instructions. The mapping unit 206 then issues the instructions, in the program order of the instructions, to appropriate reservations stations 210. In an embodiment, the reservation stations 210 operate in a manner the same as or similar to the reservation stations 106 of FIG. 1 to dispatch the instructions to the functional units 212. For example, a reservation station 210 schedules an instruction to be dispatched to a functional unit 212 when values of all operands of the instruction are obtained by the reservation station 210, in an embodiment. In an embodiment, the reservation station 210 utilizes the global age tags associated with the instructions to efficiently schedule the instructions for execution of the instructions by the functional units 212. For example, the reservation station 210 selects an instruction to be executed next from a set of instructions ready to be executed by selecting the instruction, form the set of instructions, having the oldest global age tag, in an embodiment.

After the instructions are executed by the functional units 212, the results of the instructions are provided to the common bus 218 via the completion bus arbitration unit 214. The common bus 218 provides the results of the executed instructions to the register file 216 so that the results can be written to the appropriate physical registers in the physical register file 216. In some embodiments, respective values to be written to the multiple ones of the register banks 230 are simultaneously provided by the common bus 218 to the register file 216. The respective values to be written to the multiple ones of the register banks 230 are then written in parallel to the respective register banks 230, in an embodiment. In an embodiment, the completion bus arbitration unit 214 ensures that at most one value to be written to a particular register bank 230 is provided to the common bus 218 in a same clock cycle. In this respect, the arbitration unit 214 pipelines the values to be written to a same register bank 230 when multiple instructions that reference destination registers in the same register bank 230 are simultaneously dispatched to respective functional units 214 and/or are simultaneously completed by the respective functional units 214.

With continued reference to FIG. 2, the common bus 218 also provides the completed instructions, along with the global age tags corresponding to the completed instructions, top the in-flight instruction buffer 208. In all embodiment, the in-flight instruction buffer 208 is the same as or similar to the in-flight instruction buffer 110 of FIG. 1. In an embodiment, the in-flight instruction buffer 208 operates in a manner the same as or similar to the in-flight instruction buffer 110 of FIG. 1 to retire completed instructions in the program order of the instructions. The in-flight instructions buffer 208 provides updates to the mapping unit 206 indicating global age tags of the retired instructions to the mapping unit 206. In an embodiment, in response to receiving the updates, the mapping unit 206 de-allocates the physical registers previously allocated to the retired instructions. For example, the mapping unit 206 receives a global age tag corresponding to the youngest instruction in a set of instructions being retired, in an embodiment. The mapping unit 206 then de-allocates physical registers corresponding to all instructions having global age tags with values less than the received global age tag corresponding to the youngest instruction, in an embodiment. In an embodiment, the mapping unit 206 simultaneously (e.g., in a single clock cycle) de-allocates multiple physical registers, corresponding to the instructions being retired, in one or more of the register banks 230. In an embodiment, to simultaneously (e.g., in a single clock cycle) de-allocate a set of physical registers in a particular physical register bank 230, the mapping unit 206 moves an indication of (e.g., a pointer to) the register location of the current head of the queue, in the physical register bank 230, to a register location immediately following the register location corresponding to the youngest instruction of the set of instructions, as indicated by the respective global age tags associated with the instructions. In an embodiment, the mapping unit 206 simultaneously (e.g., in a single clock cycle) de-allocates physical registers corresponding to a set of instructions being retired in multiple ones of the register banks 230 by moving respective indications of head locations to respective register locations immediately following the register location corresponding to the youngest instruction in each one of the multiple register banks 230.

The various blocks, such as the various the various units, modules, buffers, memories, etc, described with respect to FIG. 1 are implemented using hardware, in an embodiment. For example, the various blocks, such as the various units, modules, buffers, memories, etc. are hardware blocks, such as hardware units, modules, buffers, memories, etc., implemented using one or more ICs, in an embodiment. As an example, the register file 216 is implemented on a first IC, the in-flight instruction buffer 208 is implemented on a second ICs, and units 202, 204, 206, 210, 212, 214, and the common bus 218 are implemented on a third IC, in an embodiment. As another example, at least a portion of the register file 216 and/or at least a portion of the in-flight instruction buffer 208 are implemented on a same IC as the units 102, 104, 106, 112, and the common bus 114.

Figure 3:
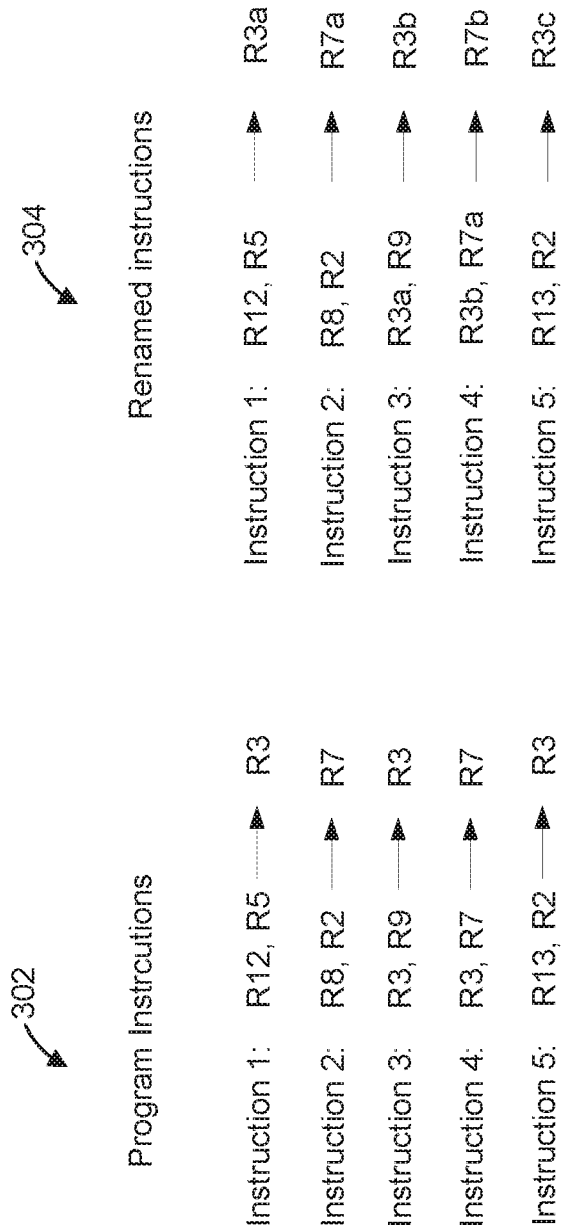
FIG. 3 illustrates an example register renaming scheme, according to an embodiment.

Turning now briefly to FIG. 3, an example register renaming scheme 300 is illustrated. In an embodiment, the register renaming scheme 300 is implemented by the mapping unit 206 of FIG. 2, and the register scheme 300 will be described with reference to FIG. 2. In FIG. 3, a set of program instructions 302 corresponds to an example set of program instructions prior to being processed by the mapping unit 206, and a corresponding set of renamed instructions 304 corresponds to the set of instructions 302 after the instructions have been processed by the mapping unit 206. Each instruction in FIG. 3 is illustrated as having two source registers (separated by a comma) corresponding to operands of the instruction, and a destination register (following an arrow) corresponding to the result of the instruction. Letters indicated as subscripts in the set of renamed instructions 304 of FIG. 3, in alphabetical order, indicate consecutive register locations in the queues in the corresponding register banks 230.

Referring to FIGS. 2 and 3, the register banks 230 are initially empty. The mapping unit 206 first processes the program instruction 1, and renames or maps the destination register R3 of the instruction 1 to the first register R3$a$ in the register bank 230 corresponding to the logical register R3, as indicated by the reference R3$a$ in the instruction set 304 of FIG. 3. Similarly, the mapping unit 206 processes instruction 2 and renames or maps the destination register. R7 of the instruction 2 to the first register R7$a$ in the register bank 230 corresponding to the logical register R7, as indicated by the reference R7$a$ in the instruction set 304 of FIG. 3. Then, the mapping unit 206 processes instruction 3. Instruction 3 includes, as a source register, an already mapped register R3. Accordingly, the mapping unit 206 renames the source register R3 as the register R3$a$. Further, the mapping unit 206 renames the destination register R3 as a next register R3$b$ in the queue of the register bank 230 corresponding to the logical register R3, as indicated by the reference R3$b$ in the instruction set 304 of FIG. 3.

Then, the mapping unit 206 processes instruction 4 by renaming the source register R3 in the instruction 4 as the now renamed register R3$b$ renaming the source register R7 in the instruction 4 as the now renamed register R7a, and renaming the destination register R7 in the instruction 4 as the next register R7b in the queue of registers of the register bank 203 corresponding to the logical register R7, as indicated by the reference R7b in the instruction set 304 of FIG. 3. Then, the mapping unit 206 processes instruction 5 and renames the destination register R3 of the instruction 5 as the next register R3c in the queue of registers of the register bank 230 corresponding to the logical register R3, as indicated by the reference R3c in the instruction set 304 of FIG. 3.

Referring again to FIG. 2, the processing system 200 is configured to flush a set of one or more instructions in a case of a branch misprediction by the branch prediction unit 220, in an embodiment. For example, upon execution of a conditional statement, the processing system 200 determines that a wrong branch was predicted for the conditional statement by the branch prediction unit 220. Then, the processing system 200 flushes instructions corresponding to the wrong branch from the processing system 200, and reclaims the resources (e.g., physical registers) allocated to these instructions. In an embodiment, when a set of one or more instructions is flushed by the processing system 220, the global age tags associated with the instructions are provided to the mapping unit 206. In another embodiment, when a set of one or more instructions is flushed by the processing system 220, the global age tag associated with the oldest instruction being flushed is provided to the mapping unit 206. In an embodiment, the mapping unit 206 de-allocates physical registers corresponding to all instructions having respective global age tags with values greater than the received global age tag corresponding to the oldest instruction being flushed, in an embodiment. In an embodiment, the mapping unit 206 simultaneously (e.g., in a single clock cycle) de-allocates multiple physical registers, corresponding to the flushed instructions, in one or more of the register banks 230. In an embodiment, to simultaneously (e.g., in a single clock cycle) de-allocate a set of physical registers in a particular physical register bank 230, the mapping unit 206 moves an indication of (e.g., a pointer to) the register location of the current tail of the queue in the register bank 230 to a register location immediately preceding the register location corresponding to the oldest instruction of the set of instructions, as indicated by the global age tags associated with the instructions. In an embodiment, the mapping unit 206 simultaneously (e.g., in a single clock cycle) de-allocates physical registers corresponding to a set of instructions being flushed in multiple ones of the register banks 230 by moving respective indications of current tail locations to respective register locations immediately preceding the register location corresponding to the oldest instruction in the set of instructions being flushed in each one of the multiple register banks 230.

In an embodiment, the processing system 200 is configured to efficiently implement various load and store instructions to simultaneously load from a memory or to store in a memory, respectively, values of multiple logical registers in corresponding multiple ones of the register banks 230. For example, the processing system 200 implements a "load multiple instruction" defined by the ARM ISA, that specifies a set of multiple logical registers to be loaded with data from consecutive locations in the memory, by loading the data in parallel to respective physical banks 230 corresponding to the specified logical registers. Similarly, the processing system 200 implements a "store multiple" instruction defined by the ARM ISA, that specifies a set of multiple logical registers from which data is to be written to consecutive memory locations, by retrieving the data in parallel from respective physical banks 230 corresponding to the specified logical registers.

Figure 4:
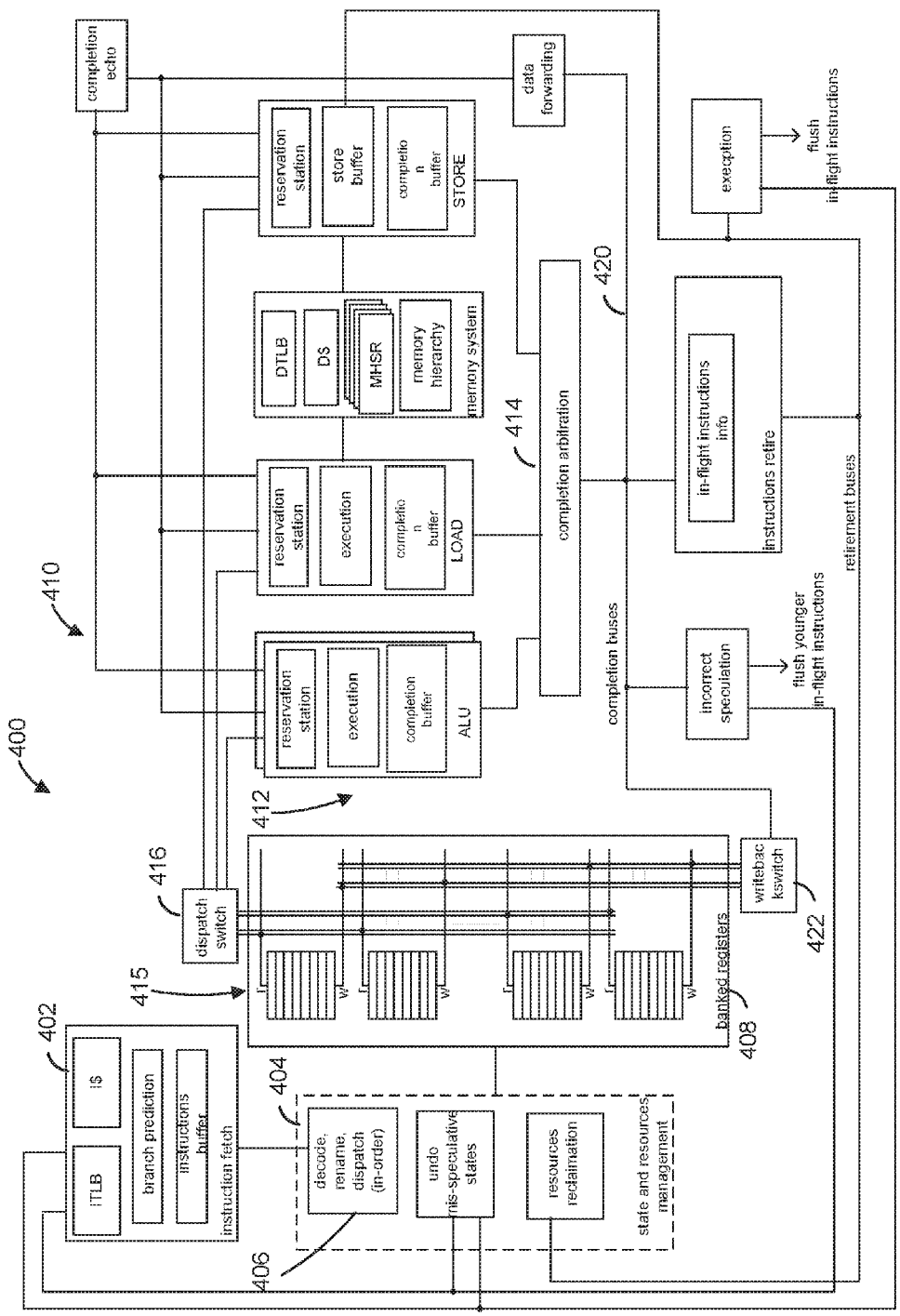
FIG. 4 illustrates an example implementation of the processing system of FIG. 2, according to an embodiment.

FIG. 4 illustrates an example implementation 400 of the processing system 200 of FIG. 2, according to an embodiment. The implementation 400 includes an instruction fetch unit 402 coupled to a state and management unit 404 having a plurality of decode 406, rename and dispatch unit 406, a banked register file 408, a plurality of reservation stations 410 coupled to respective execution (or functional) units 412, a completion arbitration unit 414, and a common bus 420. With reference to FIG. 2, the instruction fetch unit 402 corresponds to the instruction fetch unit 202, and the decode rename and dispatch unit 406 corresponds, collectively, to the decode unit 204 and the mapping unit 206, in an embodiment. The decode rename and dispatch unit 406 processes instructions provided to the decode rename and dispatch unit 406 by the instruction fetch unit 402. In an embodiment, the decode rename and dispatch unit 406 assigns global age tags to the instructions, performs register renaming with respect to the instructions, dispatches instructions to appropriate reservation stations, etc., as described above with respect to the decode unit 204 and the mapping unit 206 of FIG. 2.

In an embodiment, the banked register file 408 corresponds to the banked register file 216 of FIG. 2. The banked register file 408 comprises a plurality of register banks 415, with each register bank 415 having a single read port (marked r in FIG. 4) and a single write port (marked w in FIG. 4). The banked register file 408 is coupled to the state and management unit 404 and to the plurality of reservation stations 410. A dispatch switch 416 is coupled to the read ports of the register banks 415 and is configured to simultaneously provide data from appropriate multiple ones of the register banks 415 to the reservation stations 414. The reservation stations 410 provide data read from the register file 408 (or obtained from the common completion bus 420) to the execution units 412, which execute the instructions and provide the results of the executed instructions, via the completion arbitration unit 414, to the common bus 420 and to the register file 408. A write back switch 422 is coupled to the write ports of the respective register banks 415 and is configured to provide the results of the executed instructions to appropriate ones of the register banks 415. In an embodiment in which multiple instructions are simultaneously executed by multiple ones of the execution units 412 (e.g., in a multiple-issue system, such as a 2-issue system or a 4-issue system), the write back switch 422 provides multiple results simultaneously produced by multiple execution units 412, in parallel in a single clock cycle, to respective ones of the register banks 415.

Figure 5:
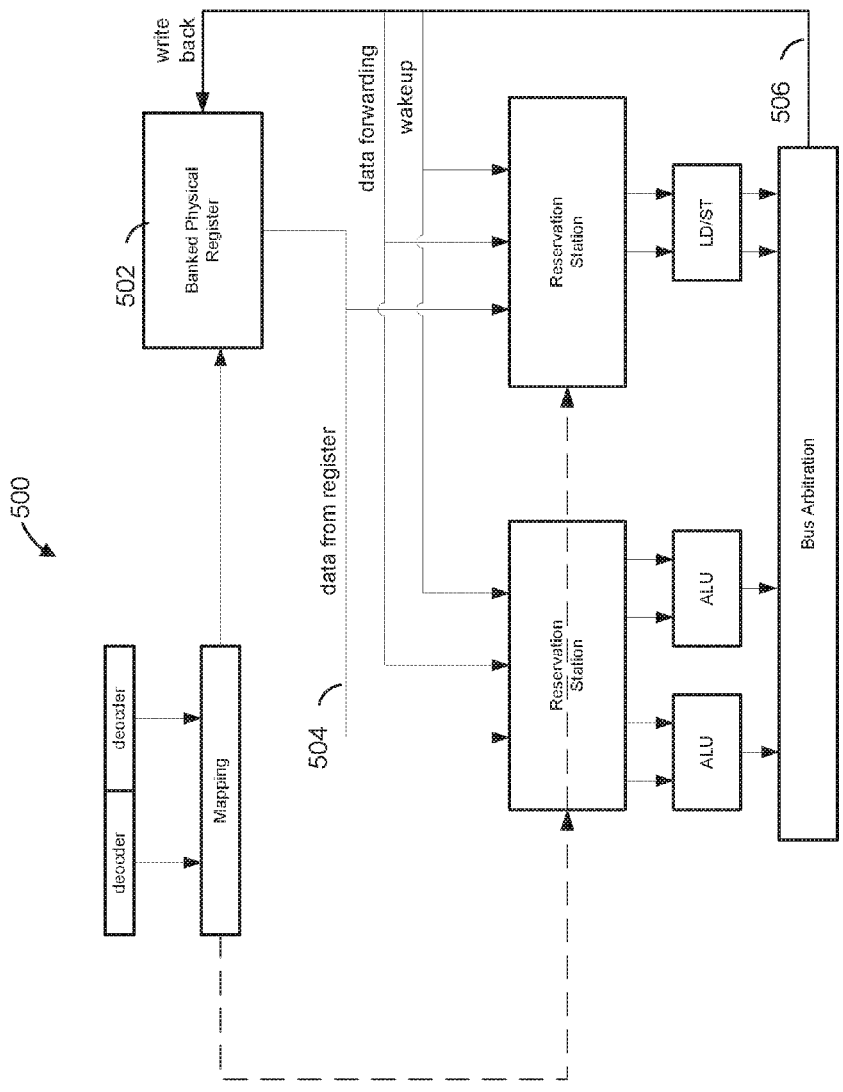
FIG. 5 is a block diagram of a processing system configured to simultaneously execute two instructions, according to an embodiment.

FIG. 5 is a block diagram of a processing system 500 configured to simultaneously execute two instructions, according to an embodiment. The processing system is generally the same as the processing system 200 of FIG. 2, in an embodiment. The processing system 500 includes a banked register file 502. Data corresponding to two instructions simultaneously issued in the system 500 is read in parallel from respective register banks in the banked register file 502 via a data bus 504, in at least some embodiments and scenarios. Similarly, data resulting from simultaneous execution two instructions in the processing system 500 is written in parallel to respective register banks of the register file 502 via a results bus 506, in at least some embodiments and scenarios.

Figure 6:
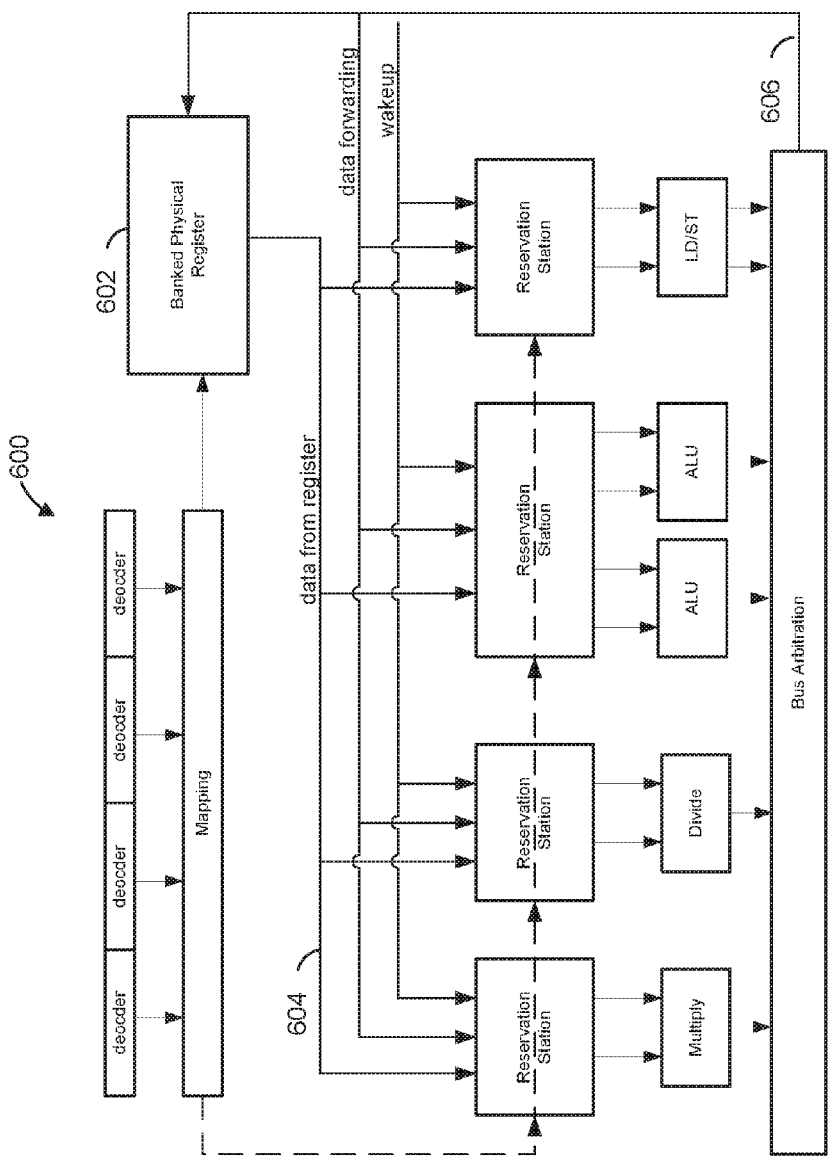
FIG. 6 is a block diagram of a processing system configured to simultaneously execute four instructions, according to an embodiment.

FIG. 6 is a block diagram of a processing system 600 configured to simultaneously execute four instructions, according to an embodiment. The system 600 is a version of the processing system 500 scaled to four-instruction issue width, according to an embodiment. The processing system 600 includes a banked register file 602. Data corresponding to four instructions simultaneously issued in the system 600 is read in parallel from respective register banks in the banked register file 602 via a data bus 604, in at least some embodiments and scenarios. Similarly, data resulting from simultaneous execution of four instructions in the processing system 600 is written in parallel to respective register banks of the register file 602 via a results bus 606, in at least some embodiments and scenarios.

Comparing the two-instruction issue width system 500 of FIG. 5 and the four-instruction issue width system 600 of FIG. 6, the banked register file 602 is relatively the same size as the banked register file 502, in at least some embodiments. Also, the data bus 504 is relatively the same as the data bus 604, in at least some embodiments. Similarly, the results bus 504 is relatively the same as the results bus 604, in at least some embodiments. Accordingly, the two-instruction issue width system 500 of FIG. 5 is scaled to the four-instruction issue width system 600 of FIG. 6 without significantly increasing the size of the processing system 500 and without significantly increasing the power dissipation of the processing system 500, in at least some embodiments.

Figure 7:
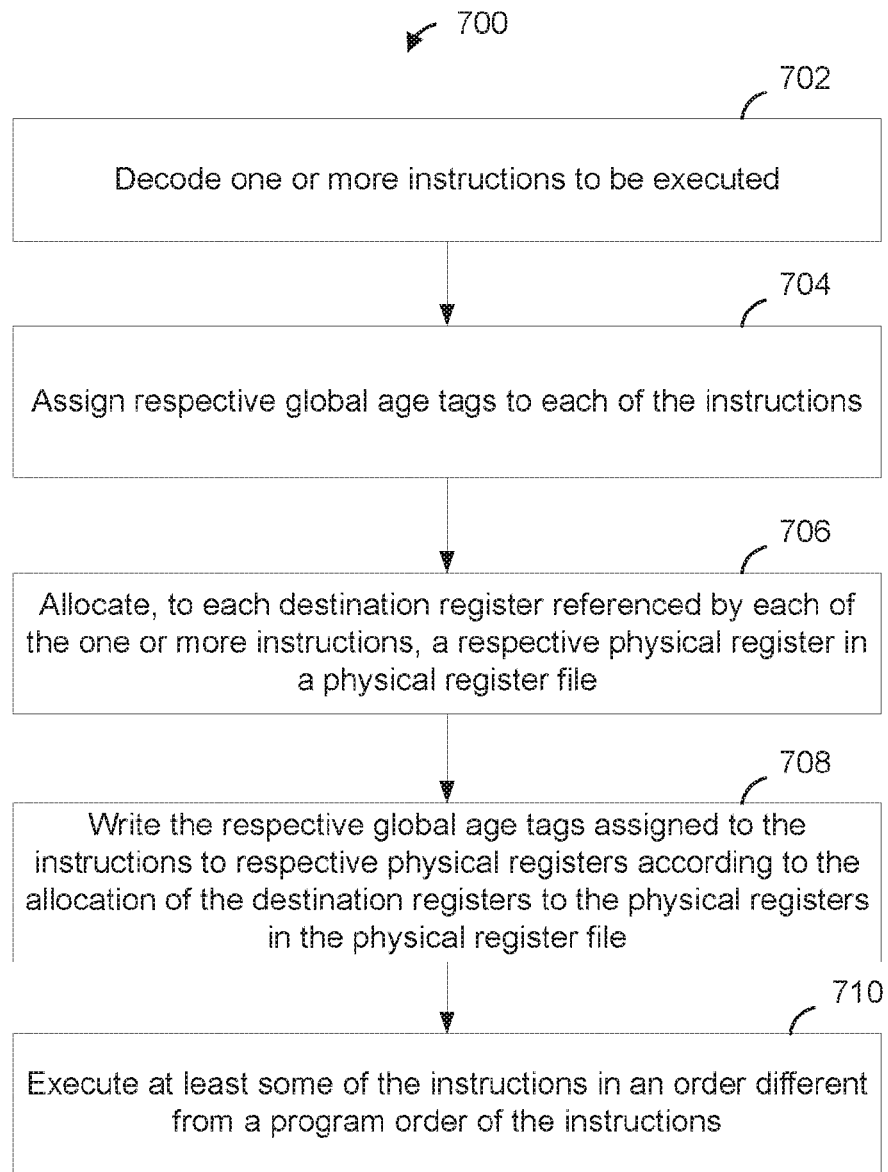
FIG. 7 is a flow diagram of an example method of executing instructions in a processing system, according to an embodiment.

FIG. 7 is a flow diagram of an example method 700 of executing instructions in a processing system, according to an embodiment. The method 700 is implemented by the processing system 100 of FIG. 1, in an embodiment. The method 700 is implemented by the processing system 200 of FIG. 1, in another embodiment. The method 700 is implemented by one of the processing system 500 of FIG. 5 or the processing system 600 of FIG. 6 in yet another embodiment. The method 700 is implemented by other suitable processing systems, in other embodiments. Similarly, the processing system 100, 200, 500 and/or 600 implement suitable methods for executing instructions other than the method 700, in other embodiments.

At block 702, one or more instructions to be executed by the processing system are decoded. The block 702 includes decoding one or several instructions in a single clock cycle, in various embodiments. For example, in one embodiment, in a single issue width processing system, a single instruction is decoded at block 702 during a single clock cycle. In another embodiment, such as in a multi-instruction issue width processing system, multiple instructions are decoded at block 702 in a single clock cycle.

At block 704, respective global age tags are assigned to the instructions decoded at block 702. In an embodiment, the respective global age tags assigned at block 704 indicate respective ages of the instructions in the processing systems and, accordingly, indicate an order of the instructions in the program code being executed by the processing system.

At block 706, respective physical registers in a physical register file (e.g., a banked physical register file) are allocated to each destination register referenced by each of the one or more instructions. For example, in an embodiment in which the register file is a banked register file that includes a plurality of register banks corresponding to a plurality of logical registers defined by instruction set architecture supported by the processing system, respective physical registers in the register banks corresponding to the logical register are allocated to the respective destination registers referenced by the one or more instructions.

At block 708, the respective global age tags assigned to the respective instructions are written to the respective physical registers according to the allocation, at block 706, of the destination registers to the physical registers in the physical register file.

At block 710, the instructions are executed. In an embodiment, block 710 includes executing at least some of the instructions in an order different from the program order of the instructions.

Figure 8:
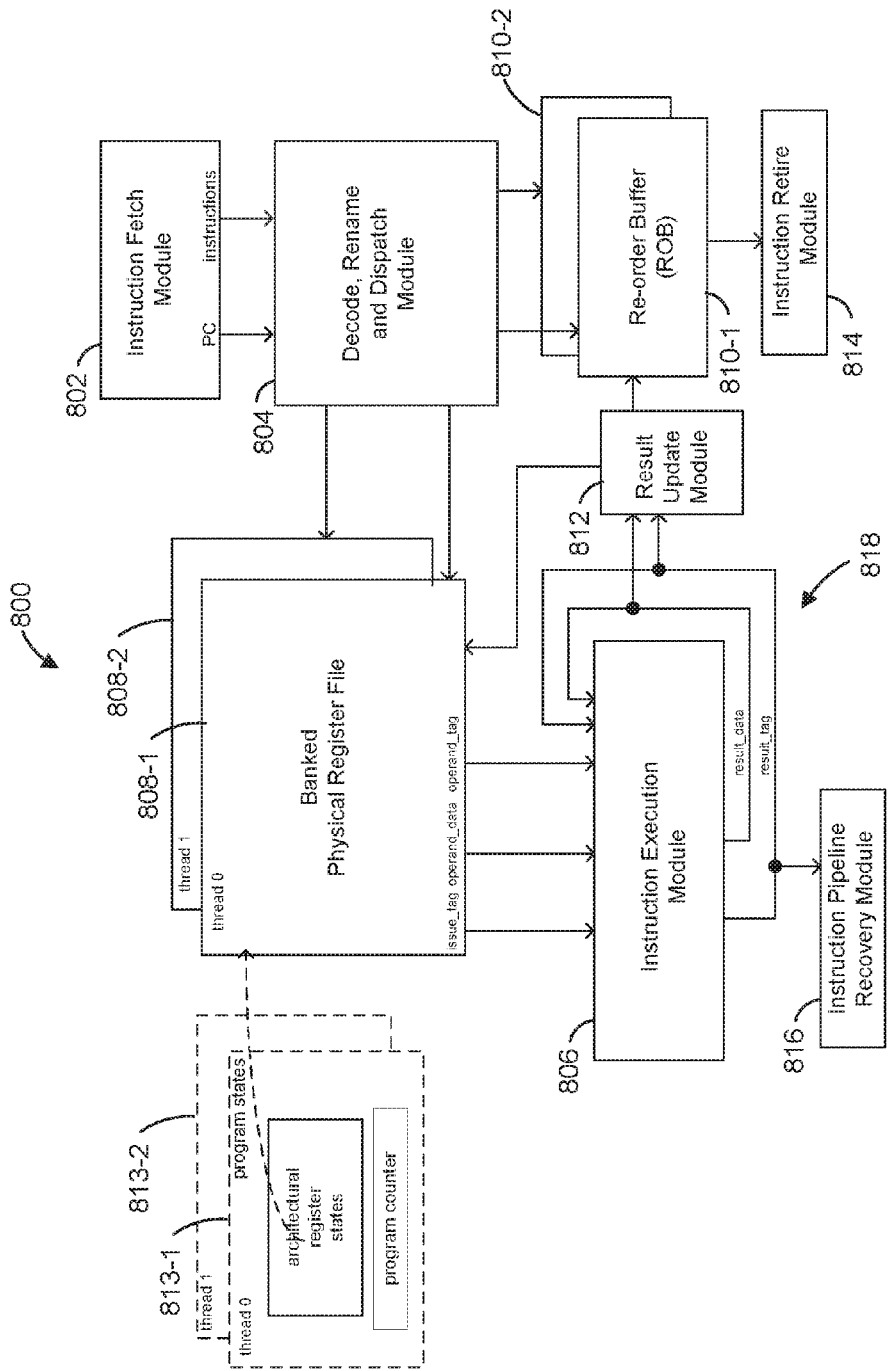
FIG. 8 is a block diagram illustrating a processing system, according to an embodiment.

FIG. 8 is a block diagram illustrating a processing system 800, according to an embodiment. In an embodiment, the processing system 800 includes one or more integrated circuits (ICs) configured to operate as discussed below. The processing system 800 is generally similar to the processing system 100 of FIG. 1 and the processing system 200 of FIG. 2. The processing system 800 includes an instruction fetch module 802, an instruction issue module (also referred to herein as a "decode, rename and dispatch unit") 804 and an instruction execution module 806. The processing system 800 also includes one or multiple banked physical register files 808, one or multiple reorder buffers 810, and one or multiple program state modules 813. With reference to FIG. 2, the instruction fetch module 802 corresponds to the instruction fetch unit 202, and the instruction issue module 804 corresponds to the decode unit 204 and the mapping unit 206 collectively, in an embodiment. With continued reference to FIG. 2, the instruction execution module 806 includes one or multiple reservation stations such as the reservation stations 210. Referring still to FIG. 2, each of the one or multiple banked physical register files 808 corresponds to the physical register file 216, and each of the one or multiple reorder buffers 8110 corresponds to the in-flight instruction buffer 208, in an embodiment. In an embodiment, the instruction fetch module 802 operates as the instruction fetch unit 202 of FIG. 2 to retrieve instructions from a memory (not shown), and to provide the instructions retrieved from the memory to the instruction issue module 804. In an embodiment, the instruction fetch module 802 additionally provides program counters (PCs) associated with the instructions to the instruction issue module 804. The PCs associated with the instructions indicate locations at which the corresponding instructions are stored in the memory, in an embodiment.

The instruction issue module 804 processes instructions provided to the instruction issue module 804 by the instruction fetch module 802. In an embodiment, the instruction issue module 804 assigns global age tags (also referred to herein as "age tags") to the instructions, performs register renaming with respect to the instructions, dispatches instructions to appropriate reservation stations in the instruction execution module 806, etc., as described above with respect to the decode unit 204 and the mapping unit 206 of FIG. 2.

A common results bus 818 is configured to provide results of executed instructions and the age tags associated with the executed instructions from the output of the execution module 806 back to the input of the execution module 806, as well as to the physical register file(s) 808 and the reorder buffer(s) 810, in an embodiment. The result update module 812 operates on results of execution of the instructions by the instruction execution module 806 to provide updates to appropriate registers in the banked physical register files 808 and the reorder buffers 810, in an embodiment. The instruction retire module 814 operates on the reorder buffers 810 to retire instructions that have been completed by the processing system 800, in an embodiment. The instruction pipeline recovery module 816 implements recovery operations to reclaim resources in the execution module 806 in case of an incorrect branch prediction by the instruction fetch module 802, in an embodiment.

In an embodiment, the processing system 800 is configured to concurrently execute multiple program threads. In an embodiment, the processing system 800 includes multiple program state module 813 configured to maintain program states of respective multiple program threads being executed by the processing system 800. In an embodiment, the processing system 800 includes a number of banked physical register files 806 that corresponds to the number of concurrent threads that can be executed by the processing system 800. Similarly, the processing system 800 includes a number of reorder buffers 808 and a number of program state modules 813 that corresponds to the number of concurrent threads that can be executed by the processing system 800. Thus, for example, the processing system 800 supports execution of two concurrent threads and, accordingly, the system 800 includes two banked physical register files 806 and two reorder buffers 808, and two program state modules 813 in the illustrated embodiment. In other embodiments, the processing system 800 supports execution of a different number of concurrent threads (e.g., 3, 4, 5, 6, 7, 8, etc.), and includes a corresponding different number of the banked physical register files 806 and the corresponding different number of reorder buffers 808 and program state modules 813. In an embodiment, the processing system 800 supports execution of only one thread at a given time. In this embodiment, the processing system 800 includes only one banked physical register files 806, only one reorder buffer 808 and only one program state module 813.

The various blocks, such as the various units, modules, buffers, memories, etc, described with respect to FIG. 8 are implemented using hardware, in an embodiment. For example, the various blocks, such as the various units, modules, buffers, memories, etc. are hardware blocks, such as hardware units, modules, buffers, memories, etc., implemented using one or more ICs, in an embodiment. As an example, the banked register file(s) 808 are implemented on a first IC, the reorder buffer(s) 810 are implemented on a second ICs, and modules 802, 804, 806, 812, 813, 814, 816 and the common bus 818 are implemented on a third IC, in an embodiment. As another example, at least a portion of the banked register file(s) 808 and/or at least a portion of the reorder buffer(s) 810 are implemented on a same IC as the modules 802, 804, 806, 812, 813, 814, 816 and the common bus 818, in an embodiment.

Figure 9:
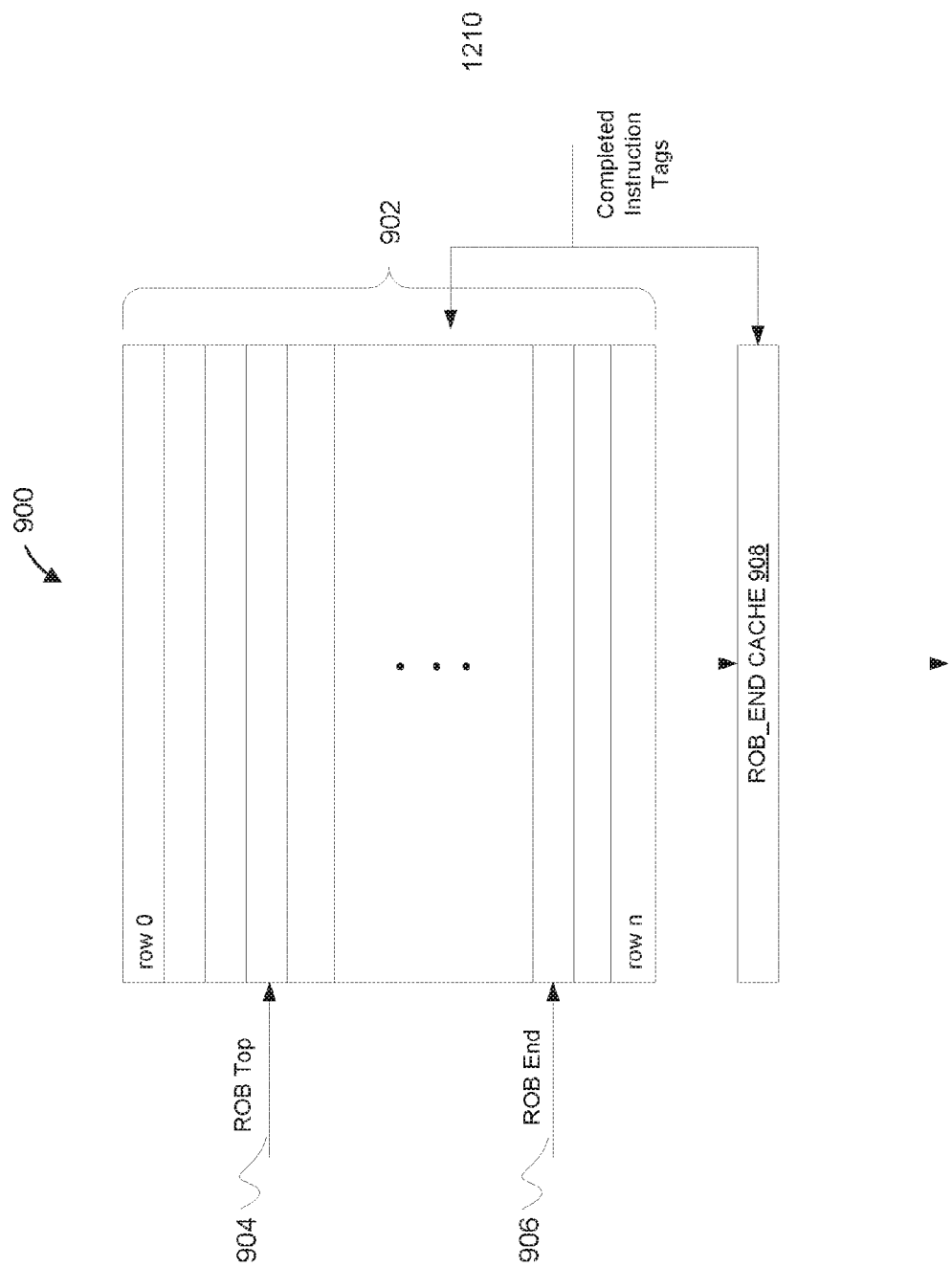
FIG. 9 is a block diagram of a reorder buffer, according to an embodiment.

FIG. 9 is a block diagram of a reorder buffer 900, according to an embodiment. In an embodiment, the reorder buffer 900 corresponds to each of the one or more reorder buffers 810 of the processing system 800 of FIG. 8 and, for ease of explanation, the reorder buffer 900 is described with respect to the processing system 800 of FIG. 8. However, the reorder buffer 900 is used with processing systems different from the processing system 800 of FIG. 8, in other embodiments. Similarly, the one or more reorder buffers 810 of the processing system 800 of FIG. 8 are suitable reorder buffers different from the reorder buffer 900, in some embodiments.

Generally speaking, the reorder buffer 900 is a memory device configured to store states of in-flight instructions in the processing system 800, in an embodiment. In an embodiment, the reorder buffer 900 is a static random access memory (SRAM) device, such as a one-read-one-write (1R1W) SRAM memory device, or another suitable memory device. In an embodiment, the reorder buffer 900 is structured as an array of rows 902, each row 902 configured to store instruction states of a set of in-flight instructions in the processing system 800. In an embodiment, a memory location used to store a state of a particular in-flight instruction in the reorder buffer 900 is indexed by a {row, column} combination that indicates a row 902 in the reorder buffer 900 and an instruction state field within the row 902 of the reorder 900. Age tags assigned to instructions at issue of the instructions to be executed by the processing system 800 include the {row, column} indications that indicate the location of corresponding instruction state fields in the reorder buffer 900, in an embodiment. In an embodiment, instructions that are sequentially issued to be executed by the processing system 800 are assigned age tags in which {row, column} indications are progressively increasing indices of location in the reorder buffer 900. As an example, an initial instruction is assigned an age tag that indicates the first row 902 (row 0) and the first instruction state field in the first row 902 (column 0), in an embodiment and scenario. Continuing with the same embodiment and scenario, subsequent instructions are assigned age tags in which rows and columns are incremented progressively such that later issued instructions are assigned age-tags with progressively increasing row and column indications until the last row (row n) and the last column in the last row are reached. Then, when the last row (row n) and the last column in the last row are reached, age tag assignment raps around to the first row and first column, and the sign of the age tag flips to indicate the wrap-around, in an embodiment. Accordingly, as will be explained in more detail below, relative ages of any two in-flight instructions in the processing system 800 are efficiently determined by comparison of respective row, column and sign indications in age-tags associated with the instructions.

With continued reference to FIGS. 8 and 9, in an embodiment, the processing system 800 maintains a ROB top indicator (e.g., pointer) 904 and a ROB End indicator (e.g., pointer) 906. The ROB top indicator 904 points to the row 902 corresponding to the age tag assigned to the most recently instruction issued for execution by the processing system 800, in an embodiment. Accordingly, the ROB top indicator 904 points to the row 902 that includes state information the most recently issued, or the "youngest," in-flight instruction in the processing system 800. In an embodiment, the ROB top indicator 904 is used by the processing system 800 to determine a location, in the reorder buffer 900, at which to store state information corresponding to a next age tag to be assigned when a next instruction is to be issued for execution by the processing system 800. The ROB end indicator 904 points to the row 902 that includes state information for the "oldest" in-flight instruction in the processing system 800, in an embodiment. In an embodiment, the ROB end indicator 904 is used to determine instructions to be retired from the processing system 800.

In an embodiment, a cache memory 908 is coupled to the reorder buffer 902. The cache memory 908 is used to cache the row 902 of the reorder buffer 900 that is pointed-to the ROB end indicator 906, in an embodiment. The cache memory 908 facilitates retiring of instructions in the row 902 that is pointed-to the ROB end pointer 906, in an embodiment.

Figure 10:
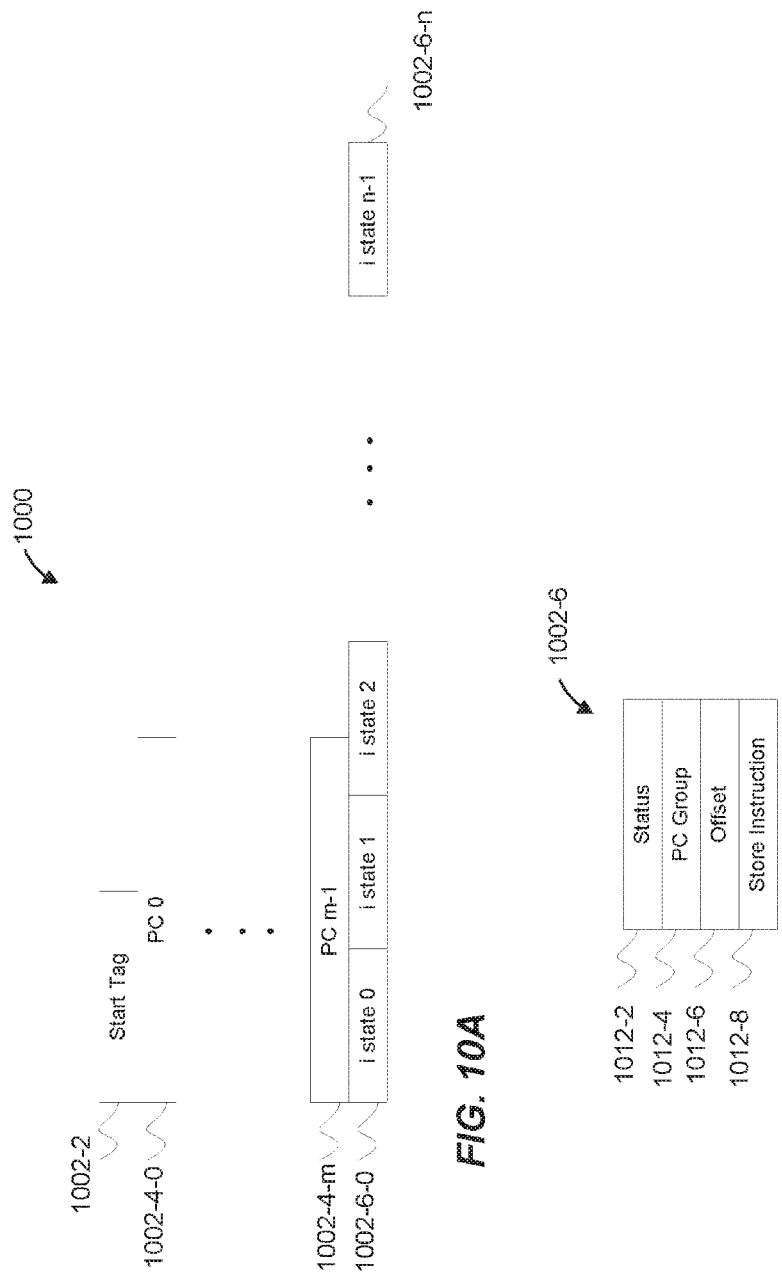
FIG. 10A is a block diagram illustrating structure of a row of a reorder buffer, according to an embodiment.
FIG. 10B is a block diagram of an i-instruction field of a reorder buffer, according to an embodiment.

FIG. 10A is a block diagram illustrating structure of a row 1000 of a reorder buffer, according to an embodiment. In an embodiment, each row 902 of the reorder buffer 900 of FIG. 9 is structured as the row 1000. In other embodiments, each row 902 of the reorder buffer 900 is structured in a suitable manner different from the row 1000. Similarly, the row 1000 is used with a suitable reorder buffer different from the reorder buffer 900, in some embodiments. For ease of explanation, the row 1000 is described below with reference to the reorder buffer 900 of FIG. 9.

The row 1000 includes a plurality of field 1002. The plurality of fields 1002 includes a start tag field 1002-2, a set of m program counter fields 1002-4, and a set of n instruction state ("i-state") fields 1002-6. The start tag field 1002-2 includes an address of the corresponding row in the buffer 900, in an embodiment. In an embodiment, the start tag 1002-2 is used in conjunction with the ROB Cache 908 to determine an address of a row that is being retired from the processing system 800. Additionally, the start tag field 1002-2 includes a sign subfield used to indicate/detect a wrap around in age tag assignment in the buffer 900, as will be explained in more detail below, in an embodiment. FIG. 10B is a block diagram of an i-state field 1002-6, according to an embodiment. The i-state field 1002-6 includes a plurality of subfields 1012. The plurality of subfields 1012 includes a status subfield 1012-2, a PC group subfield 1012-4 and an offset subfield 1012-6, and a store instruction indication subfield 1012-8.

In an embodiment, the program counter fields 1002-4 are used to store "program counters" or "instruction pointers" corresponding to in-flight instructions, in an embodiment. In an embodiment, a program counter or instruction pointer corresponding to an instruction indicates where the processing system 800 is in the program code being executed when the corresponding instruction is issued for execution by the processing system 800. In general, a program counter associated with an in-flight instruction in the processing system 800 indicates an address of the instruction in a program memory that stores the program code that includes the instruction. Because consecutive instructions in the program code have consecutive memory locations in the program memory that stores the program code, the row 1000 omits program codes associated with some instruction in a group of consecutive instructions, in an embodiment. Accordingly, the number m of PC fields 1002-4 in the row 1000 is generally less than the number n of i-state fields 1002-6 in the row 1000. For example, the row 1000 stores the program counter corresponding to a first instruction in a group of consecutive instructions, and also stores, in respective i-state fields corresponding to consecutive instructions in the program counter group, an indication of the program code group (e.g., in the PC group subfield 1012-4) and an offset of the instruction (e.g., in the offset subfield 1012-6) indicating the offset of the instruction from the first instruction in the group. Accordingly, in an embodiment, an address, in the program memory, of each instruction in a PC group can be determined based on the address of the first instruction in the PC group and the offset of the instruction from the first instruction in the PC group. In at least some embodiments, omitting program codes associated with some instructions in a group of consecutive instructions generally results in a reduced area of the reorder buffer 900 compared to a system in which the reorder buffer 900 does not omit program codes associated with these instructions.

The status subfield 1012-2 of the i-state field 1002-6 is configured to store an indication of the current status of execution of the corresponding in-flight instruction in the processing system 800. In an embodiment, the status subfield 1012-2 indicates one of possible instruction states including one or more of (i) a valid pending status, (ii) an invalid status, and (iii) a completed status. For example, in an embodiment, when an instruction is issued for execution by the processing system 800, the status of the instruction in the i-state field 1002-6 indicated by {row, column} of the age tag assigned to the instruction is set to indicate a valid pending state. Subsequently, when execution of the instruction is completed by a functional unit of the processing system 800, the status indicated by {row, column} of the age tag assigned to the instruction is set to indicate a completed state, in an embodiment.

Figure 11:
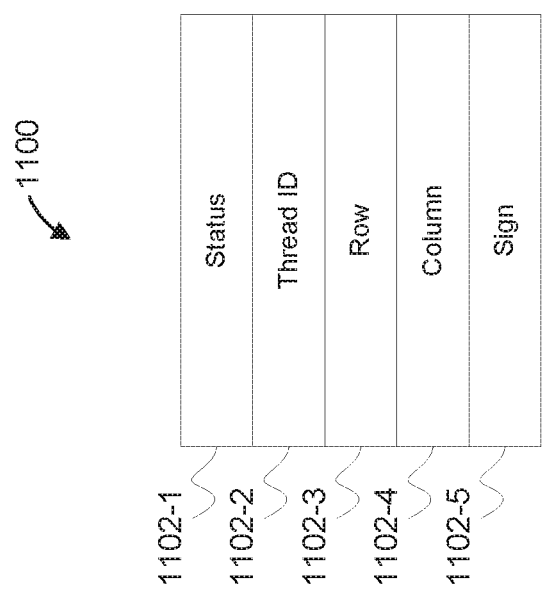
FIG. 11 is a block diagram of an age tag, according to an embodiment.

FIG. 11 is a block diagram of an age tag 1100, according to an embodiment. In an embodiment, an age tag such as the age tag 1100 is assigned to each instruction upon issued of the instruction for execution by the processing system 800. The age tag 1100 is a data structure that includes a plurality of fields 1102, in an embodiment. The plurality of fields 1102 includes a status field 1102-1, a thread ID field 1102-2, a row field 1102-3, a column field 1102-4 and a sign field 1002-5. The status field 1102-1 includes one bit to indicate the status (e.g., valid or invalid) of the age tag 1100. The thread ID field 1102-2 identifies the thread of the instruction associated with the age tag 1100. The row field 1102-3 and the column field 1102-4 indicate a row 902 and an i-state field 1002-6 in the row 902, respectively, in an embodiment. The sign field 1102-5 indicates a wrap around in the reorder buffer 900, as explained in more detail above and below, in an embodiment.

Figure 12A:
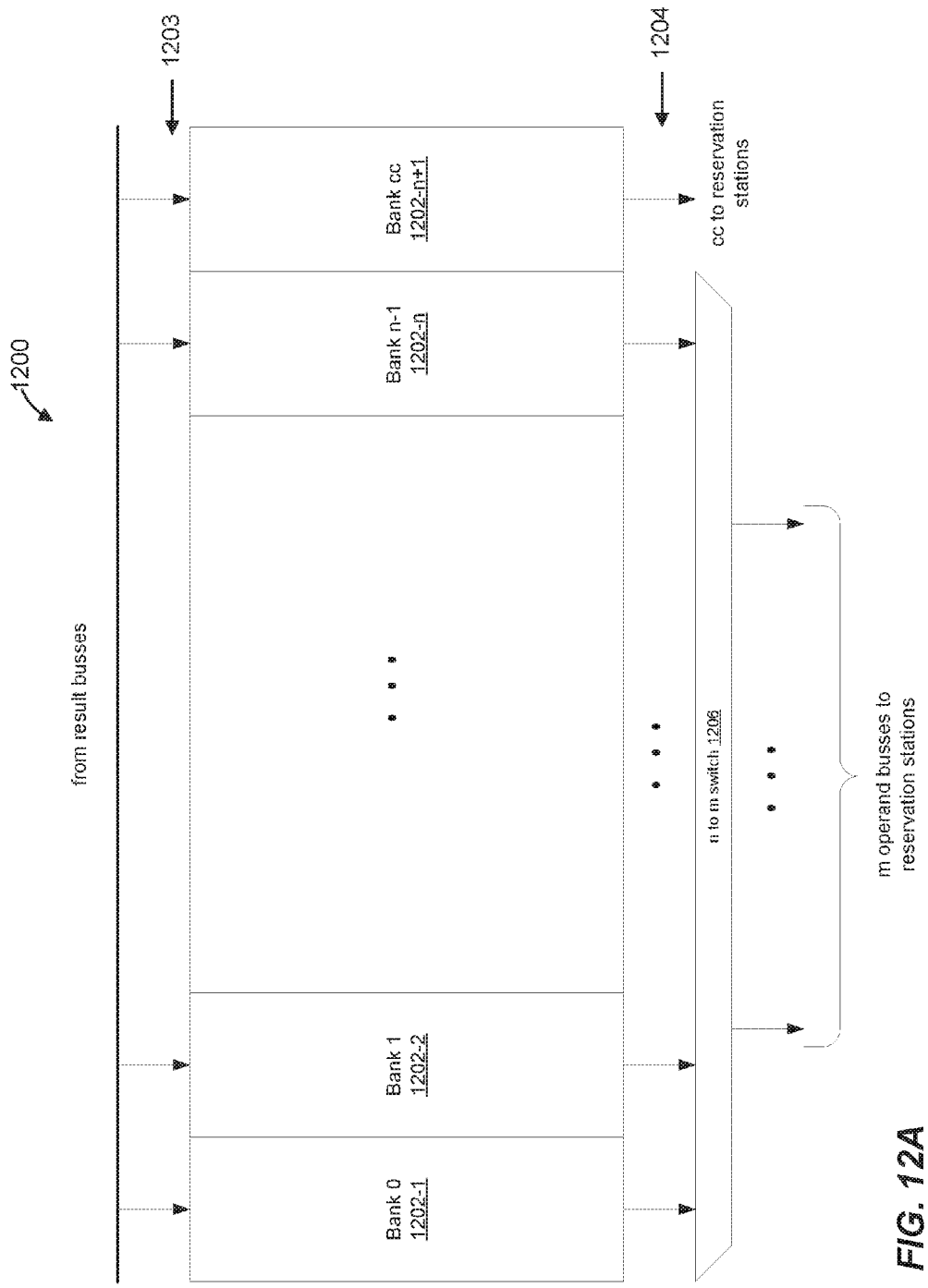
FIG. 12A is a block diagram of a physical register file, according to an embodiment.

FIG. 12A is a block diagram of a physical register file 1200, according to an embodiment. In an embodiment, the physical register file 1200 corresponds to each of the one or multiple banked 810 of FIG. 8. However, the physical register file 1200 is used with systems different from the processing system 800, in some embodiments. Similarly, the processing system 800 of FIG. 8 utilizes physical register files different from the physical register file 1200, in some embodiments. For ease of explanation, the physical register file 1200 is described below with reference to the processing system 800 of FIG. 8.

The physical register file 1200 includes a plurality of register banks 1202. In an embodiment, the number of the register banks 1202 in the physical register file 1200 corresponds to the number of logical, or architectural, registers defined by the ISA supported by the processing system 800. In an embodiment, each of the register banks 1202 corresponds to a particular one of the logical, or architectural, registers defined by the ISA supported by the processing system 800. For example, in an embodiment, the processing system 800 supports a 16-register ISA, such as a 16-register ARM ISA, and the physical register file 1200 includes 16 register banks, with each register bank corresponding to a respective one of the architectural registers defined by the 16-register ISA.

In an embodiment, each of the register banks 1202 is configured as a respective queue of registers, such as an ordered circular queue of registers. In an embodiment, a queue of registers of a register bank 1202 is configured to queue values of a particular logical register produced by execution of the in-flight instructions that reference the particular logical register. Each register bank 1202 is a one-write-one-read (1W1R) register bank that includes a single write port 1203 and a single read port 1204. Write ports 1203 are coupled to outputs of the instruction execution module 806 for writing data resulting from execution of instructions by the instruction execution module 806 to appropriate ones of the register banks 1202. Read ports 1204 are coupled to inputs of the instruction execution module 806 for providing operand data to appropriate reservation stations in the instruction execution module 806. In an embodiment, a switch 1206 is coupled to read ports 1204 of the register banks 1202. The switch 1206 selects one or multiple ones of the read ports 1204 from which to provide data to a bus that connects the physical register file 1200 to reservation stations to provide operand data from appropriate ones of the register banks 1202, in an embodiment.

Accordingly, the bus that connects the read ports 1204 of register banks 1202 to reservation stations is shared among the register banks 1202, in this embodiment.

Figure 12B:
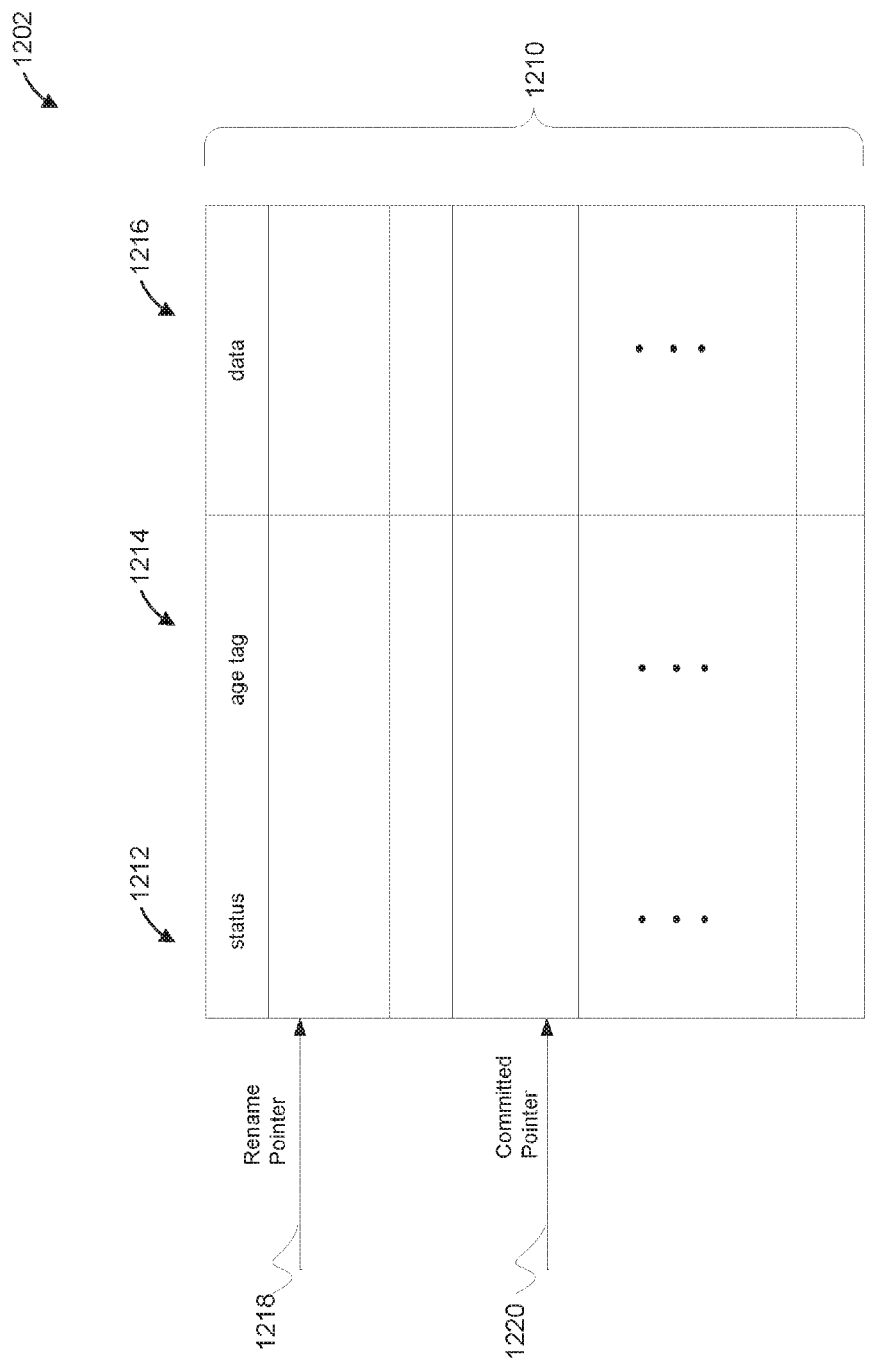
FIG. 12B is a block diagram of a register bank of a physical register file, according to an embodiment.

Referring to FIG. 12B, each register bank 1202 includes a plurality of entries 1210. In an embodiment, each entry 1210 corresponds to a physical register in the physical register bank 1202 and includes a status field 1212 to indicate a status of the corresponding physical register in the register bank 1202, an age tag field 1214 to store the age tag of the instruction that references the logical register mapped to the corresponding physical register 1202 and a data field 1216 to store data written to the corresponding physical register 1202 when execution of the corresponding instruction is completed by the processing system 800, in an embodiment.

With continued reference to FIG. 12B, a rename indicator (e.g., pointer) 1218 associated with a register bank 1202 points to the entry 1210, in the register bank 1202, that will be used when a next logical register is to be mapped to a register in the register bank 1202, in an embodiment. In an embodiment, when a logical register referenced by an instruction (e.g., a destination register of the instruction) is mapped to a physical register in the register bank 1202, the age tag assigned to the instruction is written to the age tag field of the entry 1210 currently pointed-to by the rename pointer 1218. The rename pointer 1218 is then advance to the next entry 1210 to be used for a next mapping operation in the register bank 1202 (e.g., performed with the next instruction that references the logic register associated with the physical register bank 1200).

A committed indicator (e.g., pointer) 1220 associated with a register bank 1202 points to the entry 1210, in the register bank 1202, that corresponds to the in-flight instruction that referenced the corresponding logical register and that has been last retired from the processing system 800, in an embodiment. Accordingly, the committed pointer points to the entry 1202 in which the data field 1216 includes the current value of the logical register associated with the register bank 1202, in an embodiment. Further, because the committed register indicator points to the entry 1202 that has been retired from the processing system 800, no valid age tag is stored in the age tag field 1214 of the entry 1202, in an embodiment.

In an embodiment, the status field 1212 of an entry 1210 indicates the state of the corresponding physical register as one of (i) not ready, (ii) ready, or (iii) committed. Not ready state of the physical register indicates that a logical register is currently mapped to the physical register and that the corresponding data is not yet available in the physical register, in an embodiment. Ready state of the physical register indicates that a logical register is currently mapped to the physical register and that the corresponding data is available in the physical register, in an embodiment. Committed state of the physical register indicates that the physical register is the physical register that was last retired from the register bank 1202, in an embodiment. Only the status field 1212 the entry 1202 that is pointed-to by the committed register indicator 1220 is set to indicated committed state of the corresponding physical register, in an embodiment.

Figure 13:
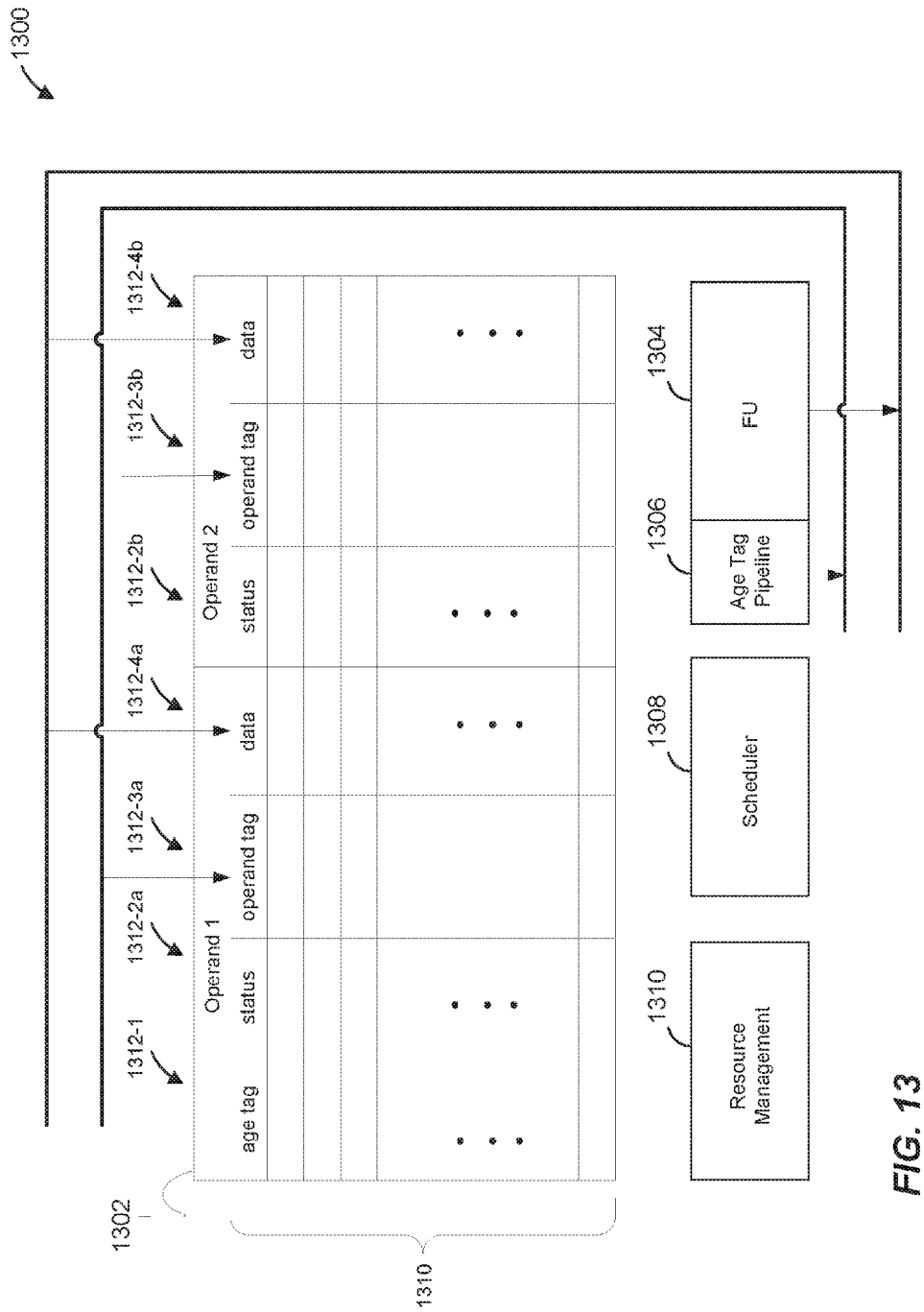
FIG. 13 is a block diagram of an instruction execution module, according to an embodiment.

FIG. 13 is a block diagram of an instruction execution module 1300, according to an embodiment. In an embodiment, the instruction execution module 806 of the processing system 800 of FIG. 8 includes one or more instruction execution modules such as the instruction execution module 1300. In other embodiments, the instruction execution module 1300 is used with suitable processing systems different from the processing system 800 of FIG. 8. Similarly, the processing system 800 of FIG. 8 utilizes instruction execution modules different from the instruction execution module 1300, in some embodiments. For ease of explanation, the instruction execution module 1300 is described below with reference to FIG. 8.

The instruction execution module 1300 includes a reservation station 1302, a functional unit 1304, and an age tag pipeline 1306. The instruction execution module 1300 also includes a scheduler 1308 and a resource management unit 1310. A common result bus 1311 is coupled to the reservation station 1302, the functional unit 1304, and the age tag pipeline 1306.

In an embodiment, the reservation station 1302 is configured to queue instructions issued to the instruction execution module 1300 for execution by the functional unit 1304 of the instruction execution module 1300. The scheduler 1308 is configured to schedule, for execution by the functional unit 1304, instructions queued in the reservation station 1302 that are ready to be executed (e.g., when all operand data for the instructions is available in the reservation station 1302). Age tags of instructions executed by the functional unit 1304 are queued in the age tag pipeline 1306, in an embodiment. When execution of an instruction is completed by the functional unit 1304, the result of the executed instruction and the age tag associated with the executed instruction are provided to the common bus 1311, in an embodiment. The common bus 1311 carries results of executed instructions and the age tags associated with the executed instructions from the output of the functional unit 1304 to the reservation station 1302 of the instruction execution module 1300, in an embodiment. The common bus 1311 also carries results of executed instructions and the age tags associated with the executed instructions from the output of the functional unit 1304 to other instruction execution modules (not shown) of the processing system 800, in an embodiment. The common bus 1311 also carries results of executed instructions and the age tags associated with the executed instructions from the output of the functional unit 1304 to the result update module 812 which, in turn, updates appropriate fields in the register file 808 and the reorder buffer 810, as will be explained in more detail below, in an embodiment.

In an embodiment, the reservation station 1302 includes a plurality of entries 1310 configured to queue instructions issued to the instruction execution module 1300. Each entry 1310 includes a plurality of fields 1312 including an age tag field 1312-1 to store the age tag associated with the instruction queued in the entry 1310 and a respective status field 1312-2, a respective operand tag field 1312-3 and a respective data field 1312-4 corresponding to each operand of the instruction format operated on by the functional unit 1304. For example, in the embodiment illustrated in FIG. 13, the functional unit 1304 is a functional unit that operates on instructions with two operands, such as an addition unit that performs an addition operation on two operands to generate a sum of the two operands. Accordingly, the reservation station 1302 includes a first status field 1312-2a, a first operand tag field 1312-3a and a first data field 1312-4a corresponding to a first operand of the instruction, and a second status field 1312-2b, a second operand tag field 1312-3b and a second data field 1312-4b corresponding to a second operand of the instruction, in the illustrated embodiment. In other embodiments, the functional unit 1304 operates on instructions with other suitable numbers (e.g., 1, 3, 4, etc.) of operands, and each entry 1310 includes corresponding other numbers of status fields 1312-2, a operand tag fields 1312-3 and data fields 1312-4.

In an embodiment, when an instruction is issued for execution by the instruction execution module 1300, an age tag associated with the instruction is provided to the instruction execution module 1300. The instruction execution module 1300 writes the age tag associated with the instruction issued to the reservation station 1300 to the age tag field 1312-1 of the entry 1310 allocated to the instruction issued to the reservation station 1300. Further, if data for an operand of the instruction issued to the reservation station 1300 is ready at the time of issue of the instruction, then the data is provided to the instruction execution module 1300, and the instruction execution module 1300 writes the data to the data field 1312-4, in the entry 1310 allocated to the instruction issued to the reservation station 1300, corresponding to the operand of the instruction. The reservation station 1300 also sets the status field 1312-2 in the entry 1310 to indicate that the operand is ready.

On the other hand, if data for an operand of the instruction issued to the reservation station 1300 is not yet available at the time of issue of the instruction, the age tag of the instruction that will subsequently produce the data is provided to the execution station 1300. The execution station 1300 then writes the age tag, of the instruction that will subsequently produce the data, to the operand tag field 1312-3, in the entry 1310 allocated to the instruction issued to the reservation station 1300, corresponding to the operand of the instruction. The reservation station 1300 also sets the status field 1312-2 in the entry 1310 to indicate that the operand is not ready. Subsequently, when data associated with the operand tag become available on the results bus 1314, the instruction execution module 1300 obtains the data and writes the Obtained data to the corresponding data field 1312-4, in an embodiment. The reservation station 1300 also updates the status field 1312-2 in the entry 1310 to indicate that the operand is ready, in an embodiment. When all status fields 1312-2 in an entry 1310 indicate that all operands are ready, the corresponding instruction become eligible to be scheduled for execution by the functional unit 1304, in an embodiment.

The resource management unit 1310 is configured to invalidate instructions queued in the reservation station 1302, and to reclaim resources in the reservation station 1302, when one or more instructions are flushed from the processing system 800, for example due to an incorrect branch prediction, as explained in more detail above and below, in an embodiment.

Figure 14A:
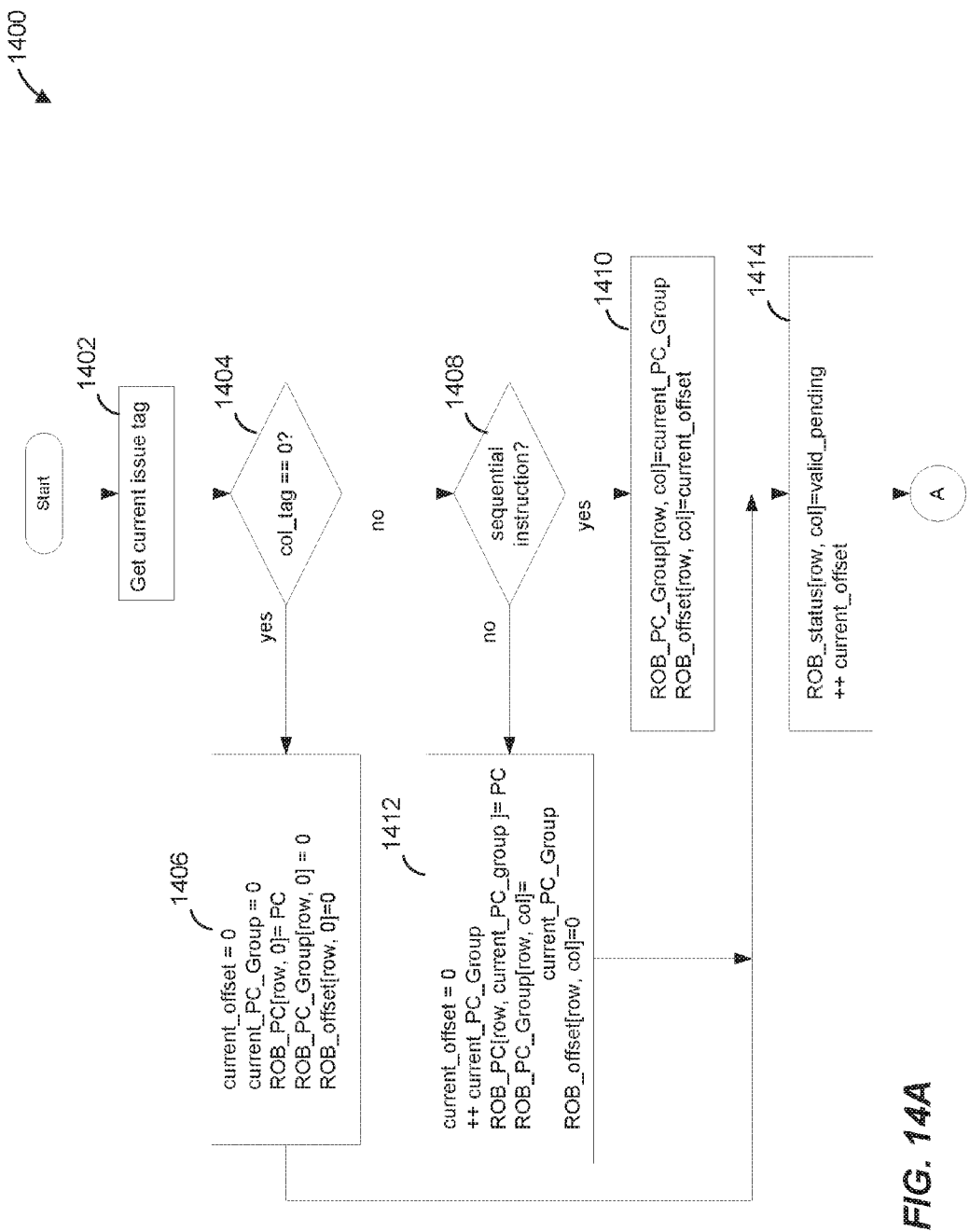
FIGS. 14A-14B are flow diagrams of portions of an example method for issuing instructions, according to an embodiment.
Figure 14B:
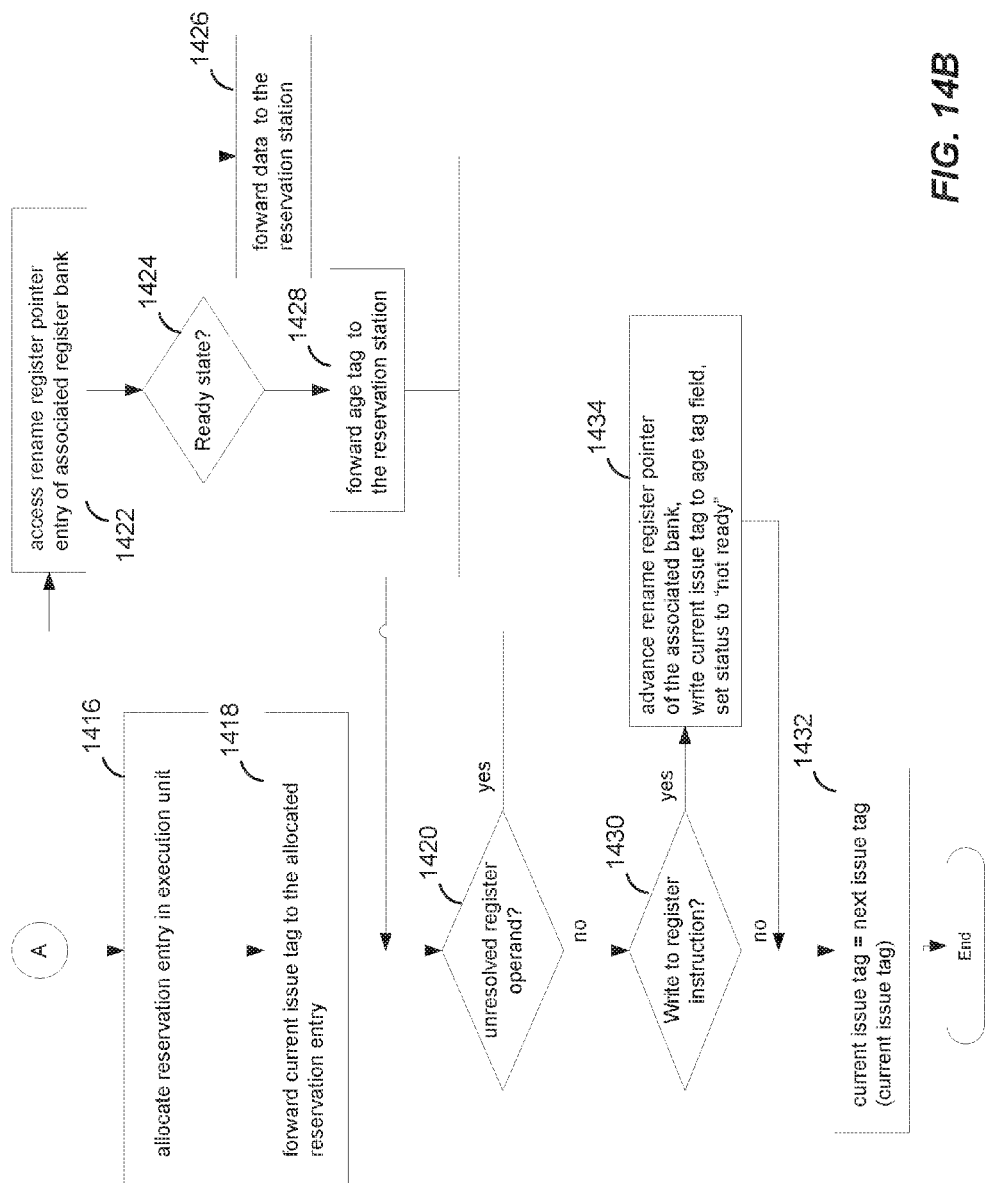

FIGS. 14A-14B are flow diagrams of portions of an example method 1400 for issuing instructions, according to an embodiment. The instruction issue module 804 of FIG. 8 is configured to implement the method 1400, in an embodiment, and the method 1400 is discussed with reference to FIG. 8 for explanatory purposes. In other embodiments, however, the method 1400 is implemented by another suitable device.

At block 1402, a current issue tag is obtained. In an embodiment, the current issue tag is the age tag assigned to the instruction being issued. In an embodiment, the current issue tag includes a row field, a column field and a sign field. The row field and the column field of the current issue tag indicate a particular i-state field 1002-6 in a particular row 902 in the reorder buffer 900, thereby associating the current instruction with the indicated i-state field 1002-6, in an embodiment. In an embodiment, the row field, the column field, and the sign field of the current issue tag collectively indicate the age of the instruction in the processing system 800.

In an embodiment, the current issue tag has the format of the age tag 1100 of FIG. 11. In another embodiment, the current issue has a suitable format different from the format of the age tag 1100 of FIG. 11. In an embodiment, if the instruction being issued is an initial instruction (e.g., the first instruction) of the program code being executed by the processing system 800, the current issue tag is generated at block 1402. In an embodiment, the row field of the current issue tag is set to indicate the first row in the reorder buffer (row=0), the column field of the current issue tag is set to indicate the i-state 0 field of in the reorder buffer (column-4), and the sign field of the issue tag is set to logic 0. On the other hand, if the instruction being issued is not the initial instruction of the program code being executed by the processing system 800, then the current issue tag obtained at block 1402 is the "next issue tag" generated at block 1434, in an embodiment.

At block 1404, it is determine whether the column field of the current tag is equal to zero. If it is determine that the column field of the current issue tag is equal to zero, this indicates that the current instruction is associated with a first i-state field 1002-6 (i-state 0) of the row 902, in the reorder buffer 900, indicated by the row field of the current issue tag, in an embodiment. In this case, the method 1400 continues at block 1406. Because the current instruction is associated with the first i-state field 1002-6 of a row 902, in an embodiment, a new program counter group is initiated with the current instruction. In an embodiment, initiating a new program counter group at block 1406 includes setting a "current PC group" indicator (e.g., register) to zero (current PC group 0), and setting a "current offset" indicator (e.g., register) to zero. In an embodiment, initiating a new PC group at block 1406 also includes updating certain fields of the row 902 indicated by the row field of the current issue tag to indicate the new PC group. In an embodiment, updating certain fields of the row 902 includes setting the first PC field (PC 0 field 1002-4-0) of the row 902 to the current value of a program counter that indicates the address, in the program memory, of the current instruction, updating the PC group sub-field 1012-4 and the offset subfield 1012-6 of the i-state 0 field in the row 902 to zero to indicate that the current instruction is the first instruction in the new PC group.

On the other hand, if it is determined at block 1404 that the column field of the current issue tag is not equal to zero, this indicates that the current issue tag corresponds to a next i-state field in the same row 902 as the issue tag that was assigned to the last issued instruction (i.e., the instruction that was issued immediately preceding the current instruction), in an embodiment. In this case, the method 1400 continues at block 1408 at which it is determined whether the current instruction is a sequential instruction with respect to the instruction that immediately preceded the current instruction. In an embodiment, it is determined whether the address, in the program memory, of the current instruction immediately follows the address of the last issued instruction. For example, the address of the current instruction is compared to the current program counter value that indicates the address the address of the last issued instruction, in an embodiment. If it is determined that the current instruction is sequential with respect to the last issued instruction, this indicates that a new PC group need not be initiated in the reorder buffer 900, in an embodiment. In this case, the method 1400 continues at block 1410, at which the i-state field 1002-6 associated with the current instruction is updated to indicate the current PC group and the offset of the current instruction in the current PC group, in an embodiment. In an embodiment, updating the i-state field 1002-6 at block 1410 includes setting the PC group subfield 1012-4 of the i-state field 1002-6 to the value of the current PC group indicator, and setting the offset subfield 1012-6 of the i-state field 1002-6 to the value of the current offset indicator.

On the other hand, if it is determined at block 1408 that the current instruction is not sequential with respect to the last issued instruction, for example if it is determined that the address, in the program memory, of the current instruction does not immediately follow the value of the current program counter that indicates the address of the last issued instruction, this indicates that a new PC group should be initiated in the reorder buffer 900, in an embodiment. In this case, the method 1400 continues at block 1412 at which a new PC group is initiated. In an embodiment, initiating a new PC group at block 1412 includes setting the current offset indicator to zero and incrementing the value of the current PC group indicator. Initiating a new PC group at block 1412 also includes updating certain fields of the row 902, of the reorder buffer 900, indicated by the row field of the current issue tag, in an embodiment. In an embodiment, updating certain fields of the row 902 includes setting the next PC field 1002-4 in the row 902 to the current value of the program counter (e.g., that indicates the address, in program memory, of the current instruction). In an embodiment, updating certain fields of the row 902 also includes setting the PC group subfield 1012-4 of the i-state field 1002-6 associated with the current instruction to the increment value of the current PC group counter, and setting the offset subfield 1012-6 of the i-state field 1002-6 associated with the current instruction to zero t indicate that the current instruction is the first instruction in the new PC group.

At block 1414, the status of the current instruction in the reorder buffer 900 is set to indicate that the current instruction is a valid pending instruction. For example, in an embodiment, the status subfield 1012-2 of the i-state field 1006-6 associated with the current instruction is set to indicate that the current instruction is a valid pending instruction, in an embodiment. Also at block 1414, the value of the current offset indicator is incremented so that the offset of the next instruction in the current PC group in the reorder buffer 900 will be correctly set to indicate the offset of the next instruction within the current PC group.

Referring now to FIG. 14B, the method 1400 continues at block 14116 at which a reservation station entry in an appropriate instruction execution module is allocated. For example, referring to FIG. 13, an entry 1310 in the reservation station 1302 of the instruction execution module 1300 is allocated. At block 1418, the current issue tag is forwarded to the entry of the reservation station entry (e.g., the reservation station entry 1310) allocated at block 1416. In an embodiment, the current issue tag forwarded to the reservation station entry is written to an age tag field (e.g., the age tag field 1312-1) of the reservation station entry. At block 1420, it is determined whether the current instruction has any operand register values that are unresolved in the processing system 800. If it is determined at block 1420 that there is an unresolved operand register, then the method 1400 continues at block 1422 at which a register bank (e.g., the register bank 1202 of FIG. 12) that corresponds to the unresolved operand register is accessed and the current value of the register is retrieved from the register entry that is pointed-to by a rename pointer associated with the register bank (e.g., the rename pointer 1218 of FIG. 12). In an embodiment, the register entry retrieved at block 1422 includes a status field such as the status field 1212 of FIG. 12, an age tag field such as the age tag field 1214 of FIG. 12 and a data field such as the data field 1216 of FIG. 12.

At block 1424, the status field of the entry retrieved at block 1422 is checked to determine wither the data for the operand register is ready in the entry of the register hank. If it is determined at block 1424 that the data is ready, then the method 1400 continues at block 1426 at which the value of the data field of the entry retrieved at block 1422 is forwarded to the reservation station entry allocated to the current instruction at block 1416. In an embodiment, the data value forwarded to the allocated reservation station entry is written to a data field (e.g., the data field 1312-4a) of the corresponding operand in the allocated entry of the reservation station. On the other hand, if it is determined at block 144 that the data is not yet ready, then the method 1400 continues at block 1428 at which the value of the age tag field of the entry retrieved at block 1422 is forwarded to the reservation station entry allocated to the current instruction at block 1416. In an embodiment, the age tag value forwarded to the allocated reservation station entry is written to a age tag field (e.g., the data field 1312-3a) of the corresponding operand in the allocated entry of the reservation station.

The method 1400 then returns to block 1420 at which it is determined whether the current instruction has an additional unresolved operand register. If it is determined at block 1420 that the current instruction has an additional unresolved operand register, then the method 1400 repeats blocks 1424-1428 for the additional unresolved operand register. When it is determined at block 1420 that the current instruction does not have any unresolved operand register (or does not have any additional unresolved registers), the method 1400 continues at block 1430 at which it is determined whether the current instruction includes a write operation to a destination register. If it is determined at block 1430 that the current instruction does not include a write operation to a destination register, then the method 1400 continues at block 1432 at which a next issue tag is generated. Example implementation of block 1432, according to an embodiment, is described below with respect to FIG. 15.

If it is determined at block 1430 that the current instruction includes a write operation to a destination register, then block 1434 is performed prior to the block 1432. At block 1434, a rename pointer of the register bank associated with the destination register of the current instruction is moved to point to the next location in the register bank, in an embodiment. Additionally, the current issue tag is written to the age tag field of the register entry now pointed-to by the rename pointer in the associated register bank, and the corresponding status field is set to indicate that the data for this physical register is not yet ready, in an embodiment. Moving the rename pointer and writing the current issue tag to the age tag field of the register entry now pointed-to by the rename pointer constitutes renaming the destination register, in an embodiment.

Figure 15:
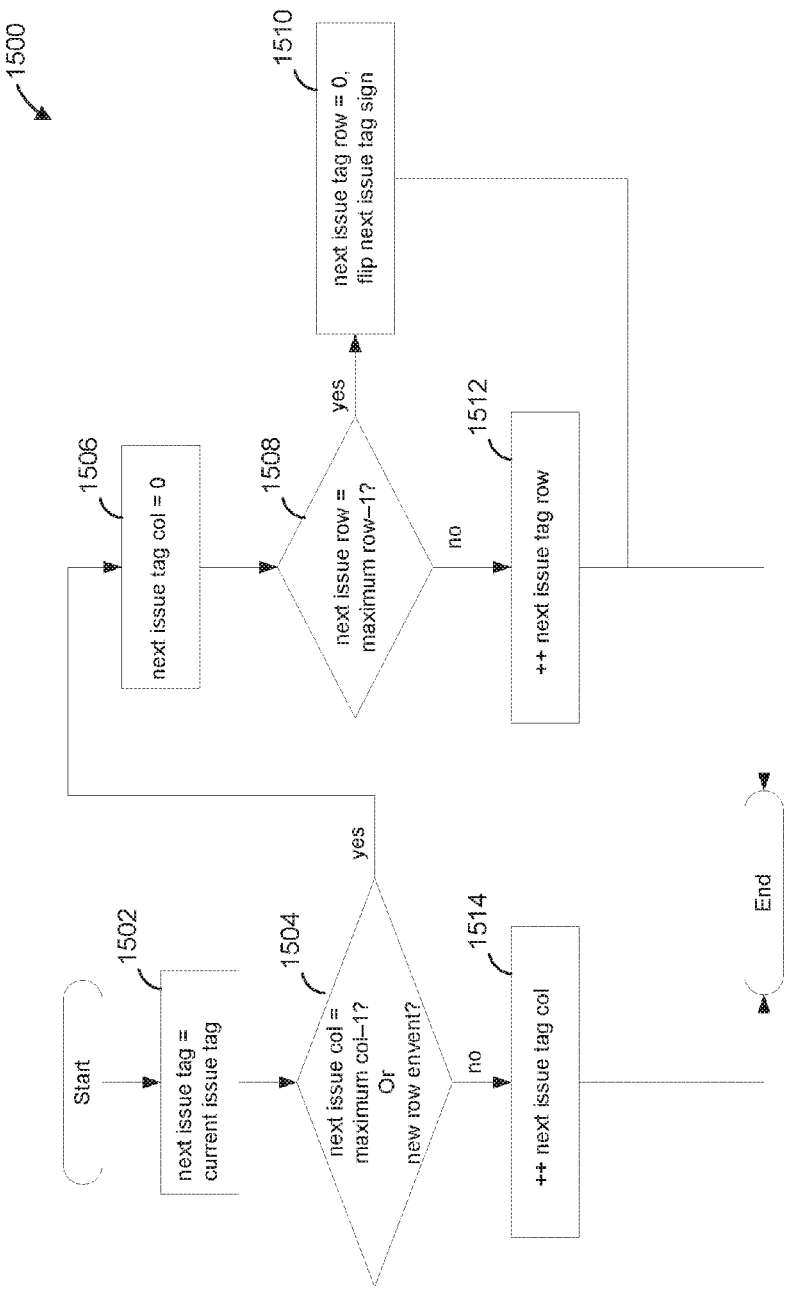
FIG. 15 is flow diagram of an example method for generating a next issue tag, according to an embodiment.

FIG. 15 is flow diagram of an example method 1500 for generating a next issue tag based on a current issue tag, according to an embodiment. The instruction issue module 804 of FIG. 8 is configured to implement the method 1500, in an embodiment, and the method 1500 is discussed with reference to FIG. 8 for explanatory purposes. In other embodiments, however, the method 1500 is implemented by another suitable device. In an embodiment, the method 1500 is performed at block 1432 of the method 1400 of FIGS. 14A-14B. In another embodiment, the method 1500 is performed in conjunction with an instruction issue method different from the method 1400 of FIGS. 14A-14B.

At block 1502, a next issue tag is set to the value of the current issue tag. At block 1504, it is determined whether the next instruction should be associated with an i-state field in a new row a new row 902 relative to the last issued instruction, in an embodiment. For example, in an embodiment, block 1504 detects one or more of the following new row events: (i) the column field of the next issue tag indicates a last column (e.g., a last i-state field 1006 in a row 902), (ii) the row 902 corresponding to the last issued instruction has an insufficient number (e.g., zero) unused PC fields 1002, (iii) the next instruction is a "single-retire" instruction that needs to be retired by itself, without concurrent retirement of any other instruction, (iv) the row 902 corresponding to the last issued instruction has been retired (even if the row has not been fully populated). In other embodiments, other new row events are detected at block 1504 in addition to or instead of the one or more of the new row events (i) (iv). If a new row event is detected at block 1504, then blocks 1506-1512 are performed. At block 1506, the column field of the next issue tag is set to zero indicate the field i-state field of a new row 902. At block 1508, it is determined whether the new row 902 will wrap around to the first row of the reorder buffer 900. For example, it is determined at block 902 that the new row 902 will wrap around to the first row of the reorder buffer 900 if the row field of the next issue tag corresponds to the last row (e.g., maximum number of row minus one) of the reorder buffer 900, in an embodiment. If it is determined at block 1508 that the new row 902 will wrap around to the first row of the reorder buffer 900, then the method 1500 continues at block 1510 at which the row field of the next issue tag is set to zero to indicate the first row 902 and the value of the sign field of the next issue tag is flipped to indicate that wrap around has occurred. On the other hand, if it is determined at block 1508 that the new row 902 will not wrap around to the first row of the reorder buffer 900, then the method 1500 continues at block 1512 at which the value of row field of the next issue tag is incremented to indicate the next row 902 in the reorder buffer 900.

Returning to block 1504, if a new row event is not detected, then the method 1500 continues at block 1514 at which the value of the column field of the next issue tag is incremented to indicate the next i-state field 1006 in the row 902 that is used for the last issued instruction.

Figure 16:
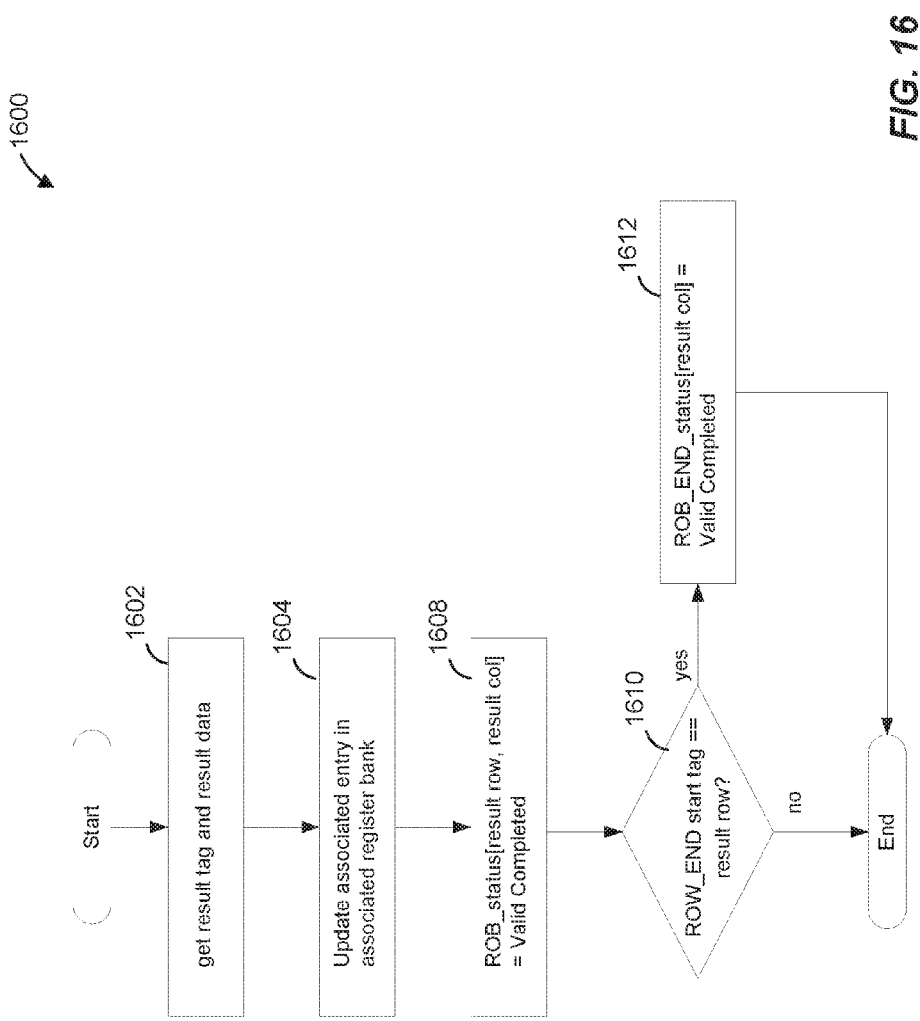
FIG. 16 is a flow diagram of an example method for updating resources when execution of an instruction is completed, according to an embodiment.

FIG. 16 is a flow diagram of an example method 1600 for updating resources when execution of an instruction is completed, according to an embodiment. In an embodiment, the method 1600 is performed by the result update module 812 of the processing system 800 of FIG. 8. In another embodiment, the method 1600 is performed by another component of the processing system 800, or is performed by a suitable processing system different from the processing system 800 of FIG. 8. For ease of explanation, the method 1600 is described below with reference to the processing system 800 of FIG. 8.

In an embodiment, the method 1600 is performed when execution of an instruction is completed by the execution module 806, and the result of the instruction and the age tag associated with the instruction are provided to the common bus 818. At block 1602, result data and result tag (age tag) are obtained from the common bus 818. At block 1604, the entry, in the physical register file 808, that is associated with the renamed destination register of the instruction is update with the result data obtained at block 1602. To determine the register bank and the particular entry of the register bank to be updated at block 1604, in an embodiment, all register banks in the physical register file 808 are checked to locate an entry that includes the age tag obtained from the common bus 818. For example, a content addressable memory (CAM) search is performed to locate the entry, in an embodiment. In another embodiment, an indication of the register bank associated with the renamed destination register of the instruction and the rename pointer location in the register bank are provided to the execution module 806 at issue of the instruction. For example, the indication of the register bank and the rename pointer are included in the issue tag (age tag) assigned to the instruction. The indication of the register bank and the rename pointer are then provided to the common bus 818 (e.g., as part of the age tag) with the result data, in an embodiment. The indication of the register bank and the rename pointer are used to determine the register bank and the particular entry of the register bank to be updated at block 1604, in an embodiment.

At block 1608, the i-state field 1006 associated with the instruction is updated to indicate that the instruction has been completed. In an embodiment, the row field and the column field of the result tag are used at block 1608 to identify the particular i-state field 1006 associated with the instruction. The status subfield 1012-2 of the identified i-state field is then set to "valid completed" state to indicate that the instruction has been completed, in an embodiment.

At block 1610, it is determined whether the ROB end cache 908 should also be updated. The ROB end cache 908 should be updated if the value of the start tag field 1002-2 in the ROB end cache 908 corresponds to the value of the row field of the result tag, indicating that the corresponding row 902 of the reorder buffer 900 is currently copied into the ROB end cache 908, in an embodiment. Accordingly, at block 1610, the value of the value of the start tag field 1002-2 in the ROB end cache 908 is compared to the value of the row field of the result tag, in an embodiment. If it is determined at block 1610 that the ROB end cache 908 should be updated, then the method 1600 continues at block 1612, at which the state subfield of the corresponding i-state field of the ROB end cache 908 is updated (e.g., set to indicate "valid completed" state) to indicate that the instruction has been completed, in an embodiment.

Figure 17:
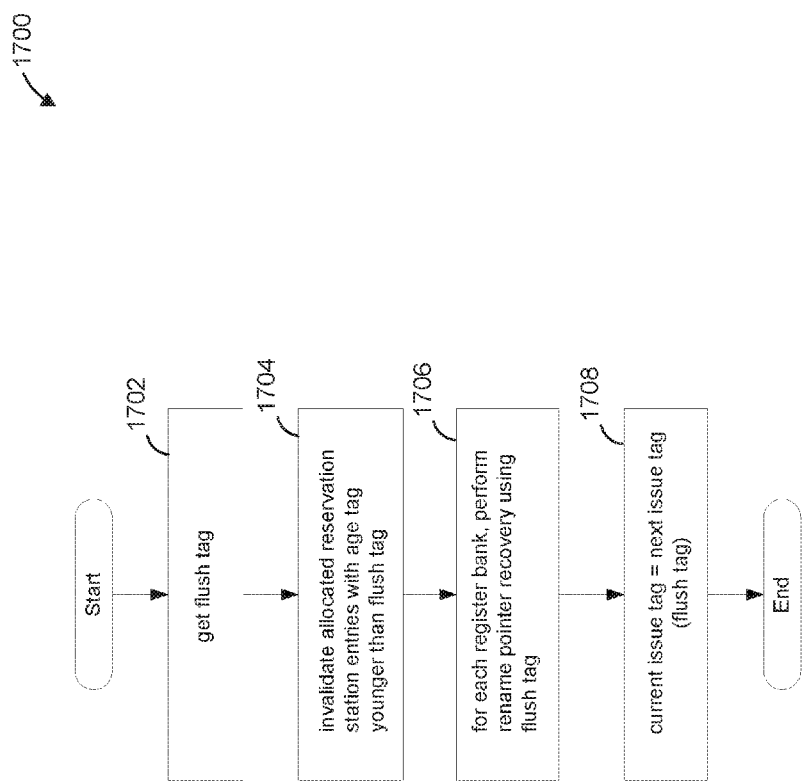
FIG. 17 is a flow diagram of an example method for instruction pipeline recovery when it is determined that a wrong branch prediction was made, according to an embodiment.

FIG. 17 is a flow diagram of an example method 1700 for instruction pipeline recovery when it is determined that a wrong branch prediction was made, according to an embodiment. In an embodiment, the method 1700 is performed by the instruction pipeline recovery module 816 of the processing system 800 of FIG. 8. In another embodiment, the method 1700 is performed by another component of the processing system 800, or is performed by a suitable processing system different from the processing system 800 of FIG. 8. For ease of explanation, the method 1700 is described below with reference to the processing system 800 of FIG. 8.

At block 1702, a flush tag is obtained. In an embodiment, the flush tag is the age tag of the instruction (e.g., conditional statement) based on execution of which it was determined at a wrong prediction was made. At block 1704, all reservation station entries, in the processing system 800, associated with age tags younger than the flush tag are invalidated (e.g., corresponding operand status fields are set to indicate the "invalid" state). In an embodiment, to determine whether a reservation station entry is associated with an age tag that is younger than the flush tag, in an embodiment, the age tag field of the reservation station entry is compared with the flush tag to determine whether the {row, column, sign} field combination in the age tag indicates a younger age as compared to the age indicated by the {row, column, sign} field combination in the flush tag. For example, to determine whether an age tag is younger than the flush tag, in an embodiment, the {row, column, sign} field combination in the flush tag is compared with the {row, column, sign.} field combination in the age tag, in an embodiment. If the {row, column, sign} field combination in the flush tag indicates an i-state field location in the reorder buffer 900 that precedes the i-state field location indicated by the {row, column, sign} field combination in the age tag, then it is determined that the age tag is younger than the flush tag, in all embodiment. For example, if (i) the sign field in the flush tag has a value that is the same as the value of the sign field in the age tag, (ii) the row indicated by the row field in the flush tag is the same as the row indicated by the row field in the age tag and (iii) the i-state field indicated by the column field in the flush tag precedes the i-state field indicated by the column field in the age tag, then it is determined that the age tag is younger than the flush tag, in an embodiment. As another example, if (i) the sign field in the flush tag has a value that is flipped with respect to the value of the sign field in the age tag, (ii) the row indicated by the row field in the flush tag is the same as the row indicated by the row field in the age tag and (iii) the i-state field indicated by the column field in the flush tag follows the i-state field indicated by the column field in the age tag, then it is determined that the age tag is younger than the flush tag, in an embodiment. In an embodiment, if it is determined that an age tag is younger than the flush tag, then the corresponding entry is invalidated at block 1704, in an embodiment.

At block 1706, rename pointer recovery using the flush tag is performed with each register bank in the register file 808 to reclaim resources in the register file 808. An example method for performing rename point recovery at bock 1706, according to an embodiment, is described below with respect to FIG. 18.

At block 1708, a next issue tag is generated based on the current issue tag. For example, the method 1500 of FIG. 15 is performed with the flush tag being the current issue tag, in an embodiment. Generating the next issue tag with the flush tag being the current issue tag reclaims resources, in the reorder buffer 900, that were used for the invalidated instructions, in an embodiment.

Figure 18:
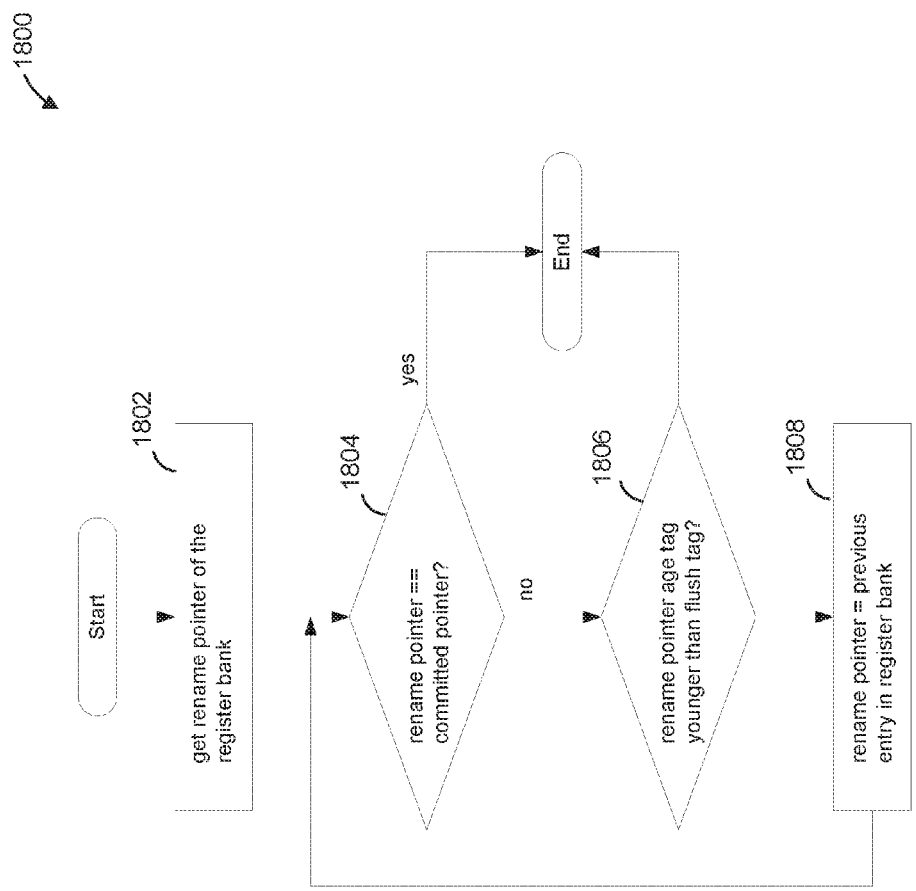
FIG. 18 is a flow diagram of an example method for performing rename pointer recovery operations in a register bank, according to an embodiment.

FIG. 18 is a flow diagram of an example method 1800 for performing rename pointer recovery operations in a register bank, such as the register bank 1202 of FIG. 12B, according to an embodiment. In an embodiment, the method 1800 is performed by the instruction pipeline recovery module 816 of the processing system 800 of FIG. 8. In another embodiment, the method 1800 is performed by another component of the processing system 800, or is performed by a suitable processing system different from the processing system 800 of FIG. 8. For ease of explanation, the method 1800 is described below with reference to the processing system 800 of FIG. 8. In an embodiment, the method 1800 is performed, for each register bank, at block 1706 of the method 1700 of FIG. 17. In another embodiment, the method 1700 is performed in conjunction with a recovery method different from the method 1700 of FIG. 17.

At block 1802, the rename pointer 1218 of the register bank 1202 is obtained. At block 1804, it is determined whether rename pointer 1218 coincides with the committed pointer 1220 of the register bank 1202. If it is determined at block 1804 that the rename pointer 1218 coincides with the committed pointer 1220, this indicates that no further update of rename pointer can be made, and the method 1800 is completed. If it is determined at block 1804 that the rename pointer 1218 does not coincide with the committed pointer 1220, then the age tag field of the entry pointed-to by the rename pointer 1218 is checked at block 1806 to determine whether the age tag is younger than the flush tag. In an embodiment, determining, at block 1806, whether the age tag is younger than the flush tag is performed in a manner the same as or similar to the manner described above with respect to the block 1704 of FIG. 17. If it is determined at block 1806 that the age tag is younger than the flush tag, then, at block 1808, the rename pointer 1218 is updated to point to the previous entry in the register bank, and the method 1500 returns to block 1804.

Figure 19:
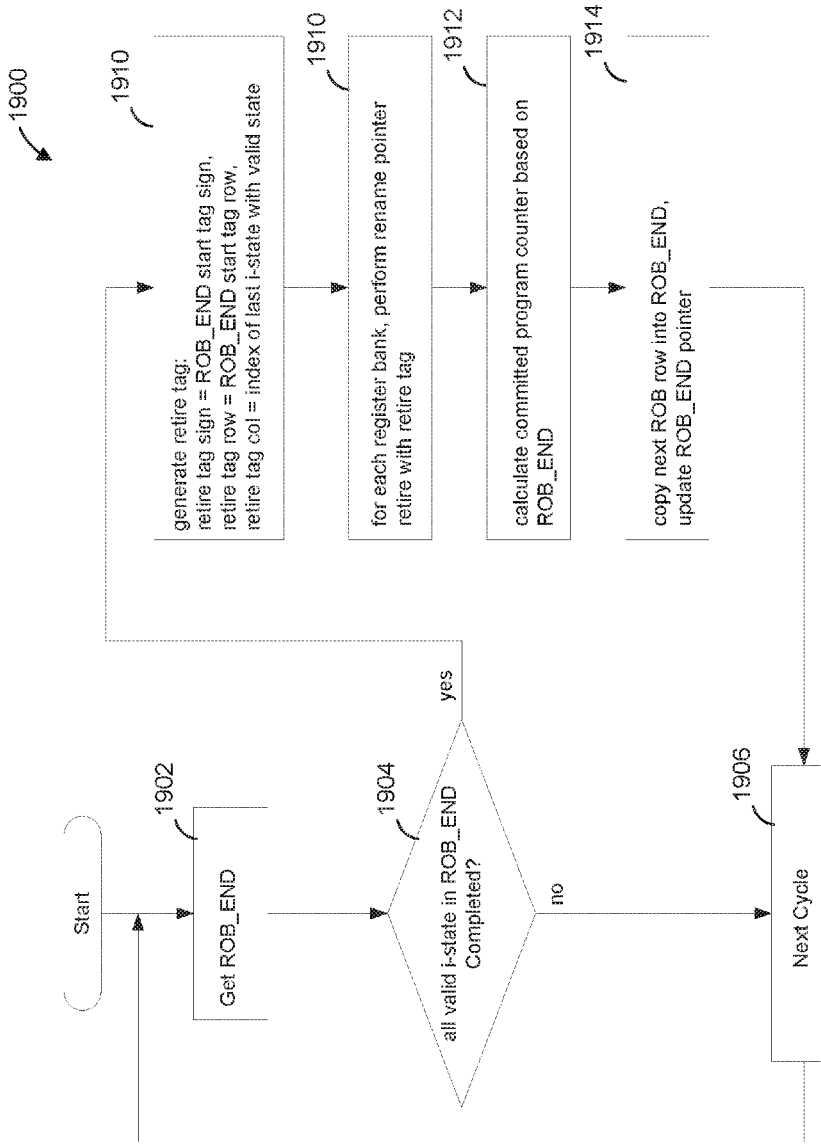
FIG. 19 is a flow diagram of an example method for retiring completed instructions, according to an embodiment.

FIG. 19 is a flow diagram of an example method 1900 for retiring completed instructions, according to an embodiment. In an embodiment, the method 1900 is performed by the instruction retire module 814 of the processing system 800 of FIG. 8. In another embodiment, the method 1900 is performed by another component of the processing system 800, or is performed by a suitable processing system different from the processing system 800 of FIG. 8. For ease of explanation, the method 1900 is described below with reference to the processing system 800 of FIG. 8.

At block 1902, contents of the ROB End cache 904 are obtained. At block 1904, the status subfields 1012-2 of i-state fields 1002-6 are checked to determine whether all valid instructions associated with the state fields 1002-6 have been completed. If it is determined at block 1904 that not all valid instructions associated with the state fields 1002-6 have yet been completed, this means that the corresponding row 902 of the reorder buffer 900 is not yet ready to be retired. In this case, a next cycle is initiated at block 1906 and the method 1900 returns to block 1902. On the other hand, if it is determined at block 1904 that all valid instructions associated with the state fields 1002-6 have been completed, this indicates that the corresponding row 902 of the reorder buffer 900 is ready to be retired. In this case, the method 1900 continues at block 1908, at which a retire tag is generated. The retire tag is the age tag associated with the last i-state field having a valid completed state in the ROB End cache 904, in an embodiment. In an embodiment, generating the retire tag includes (i) setting the sign field of the retire tag to the sign indicated in the ROB End start tag, (ii) setting the row field of the retire tag to the value of the row field of the ROB End start tag, and (iii) setting the column field of the retire tag to indicate the last i-state field having a valid completed state in the ROB End cache 904.

At block 1910, rename pointer retire using the retire tag is performed with each register bank in the register file 808 to reclaim resources in the register file 808. An example method for performing rename pointer retire operations at bock 1910, according to an embodiment, is described below with respect to FIG. 20.

At block 1912, the program counter corresponding to the last retired instruction is calculated. In an embodiment, the program counter is calculated by adding the offset indicated in the offset subfield 1012-6 of the i-state field 1002-6 associated with the last retired instruction to the value of the program counter field 1002-4 indicated by the PC group subfield 1012-4 of the i-state field 1002-6 associated with the last retired instruction. The calculated program counter is stored (e.g., in a committed program counter register) to indicated the current program state, in an embodiment.

At block 1914, the ROB end pointer 906 is updated to point to the next row 902 of the reorder buffer 900, and contents of the next row 902 are copied to the ROB End cache 904. The method 1900 then returns to block 1906 at which a next cycle is initiated to perform the method 1900 with the next row 902.

Figure 20:
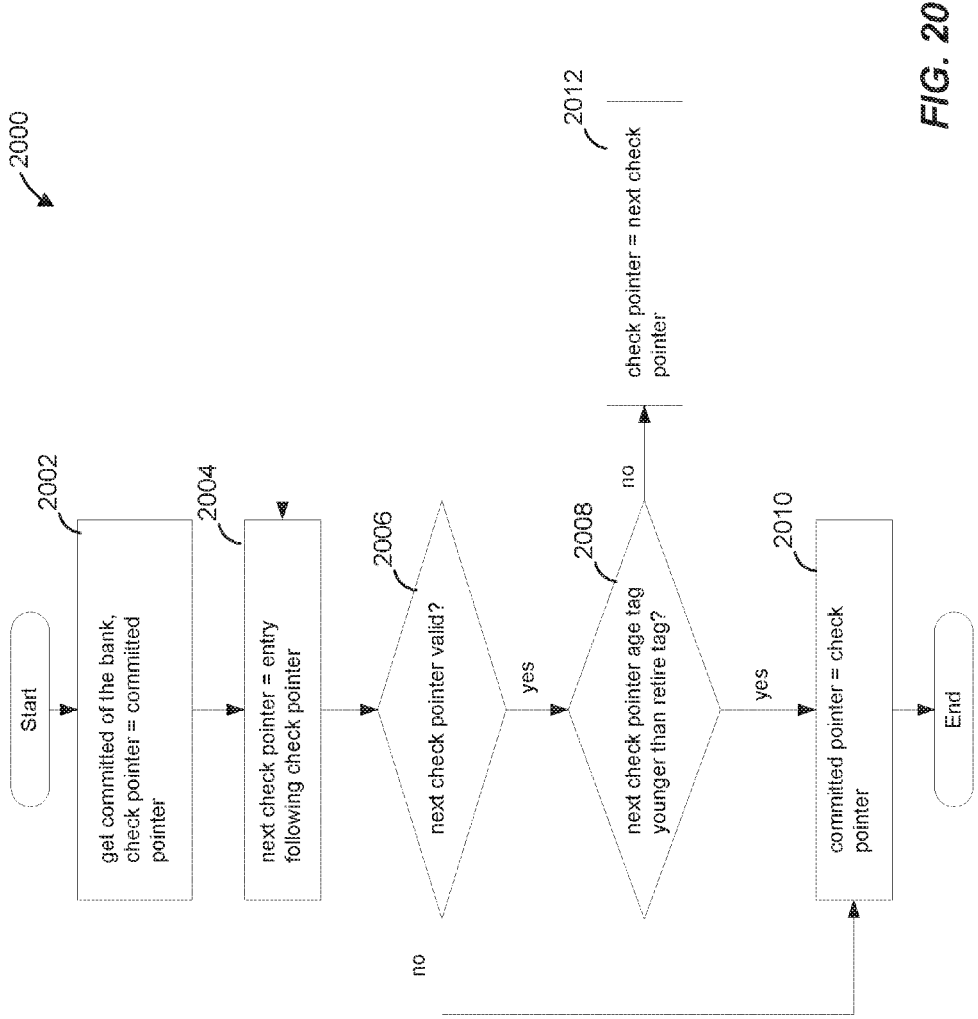
FIG. 20 is a flow diagram of an example method for performing rename pointer update operations in a register bank when instruction are retired, according to an embodiment.

FIG. 20 is a flow diagram of an example method 2000 for performing rename pointer update operations in a register bank, such as the register bank 1202 of FIG. 12B, when instruction are retired, according to an embodiment. In an embodiment, the method 2000 is performed by the instruction retire module 818 of the processing system 800 of FIG. 8. In another embodiment, the method 2000 is performed by another component of the processing system 800, or is performed by a suitable processing system different from the processing system 800 of FIG. 8. For ease of explanation, the method 2000 is described below with reference to the processing system 800 of FIG. 8. In an embodiment, the method 2000 is performed, for each register bank, at block 1910 of the method 1900 of FIG. 19. In another embodiment, the method 2000 is performed in conjunction with a recovery method different from the method 1900 of FIG. 19.

At block 2002, the committed pointer 1220 of the register bank 1202 is obtained, and a check pointer is set to point to the entry 1210 pointed-to by the committed pointer 1220. At block 2004, a next check pointer is set to point the entry 1210 immediately following the entry 1210 pointed-to by the committed pointer 1220. At block 2006, it is determine whether the next check pointer is valid. For example, in an embodiment, the next check pointer is not valid, for example by checking the status field of the entry 1210 pointed-to by the next check pointer. If it is determined at block 2006 that the next check pointer is valid, then the age tag field of the entry pointed-to by the next check pointer is checked at block 2008 to determine whether the age tag is younger than the retire tag. In an embodiment, determining, at block 2008, whether the age tag is younger than the retire tag is performed in a manner similar to the determination of whether an age tag is younger than a flush tag as described above with respect to the block 1704 of FIG. 17. For example, if (i) the sign field in the retire tag has a value that is the same as the value of the sign field in the age tag, (ii) the row indicated by the row field in the retire tag is the same as the row indicated by the row field in the age tag and (iii) the i-state field indicated by the column field in the retire tag precedes the i-state field indicated by the column field in the age tag, then it is determined that the age tag is younger than the retire tag, in an embodiment. As another example, if (i) the sign field in the retire tag has a value that is flipped with respect to the value of the sign field in the age tag, (ii) the row indicated by the row field in the retire tag is the same as the row indicated by the row field in the age tag and (iii) the i-state field indicated by the column field in the retire tag follows the i-state field indicated by the column field in the age tag, then it is determined that the age tag is younger than the retire tag, in an embodiment. If it is determined at block 2008 that the age tag is younger than the retire tag, or if it is determined at block 2006 that the next check pointer is not valid, then, at block 2010, the committed pointer 1220 is updated to point to the entry 1210 pointed-to by the check pointer, and the method 2000 completes, in an embodiment.

On the other hand, if it is determined at block 2008 that the age tag is not younger than the retire tag, then the method 2000 continues at block 2012, at which the check pointer is set to point to the entry 1210 pointed-to by the next check pointer and the method 2000 returns to block 2004.

Figure 21:
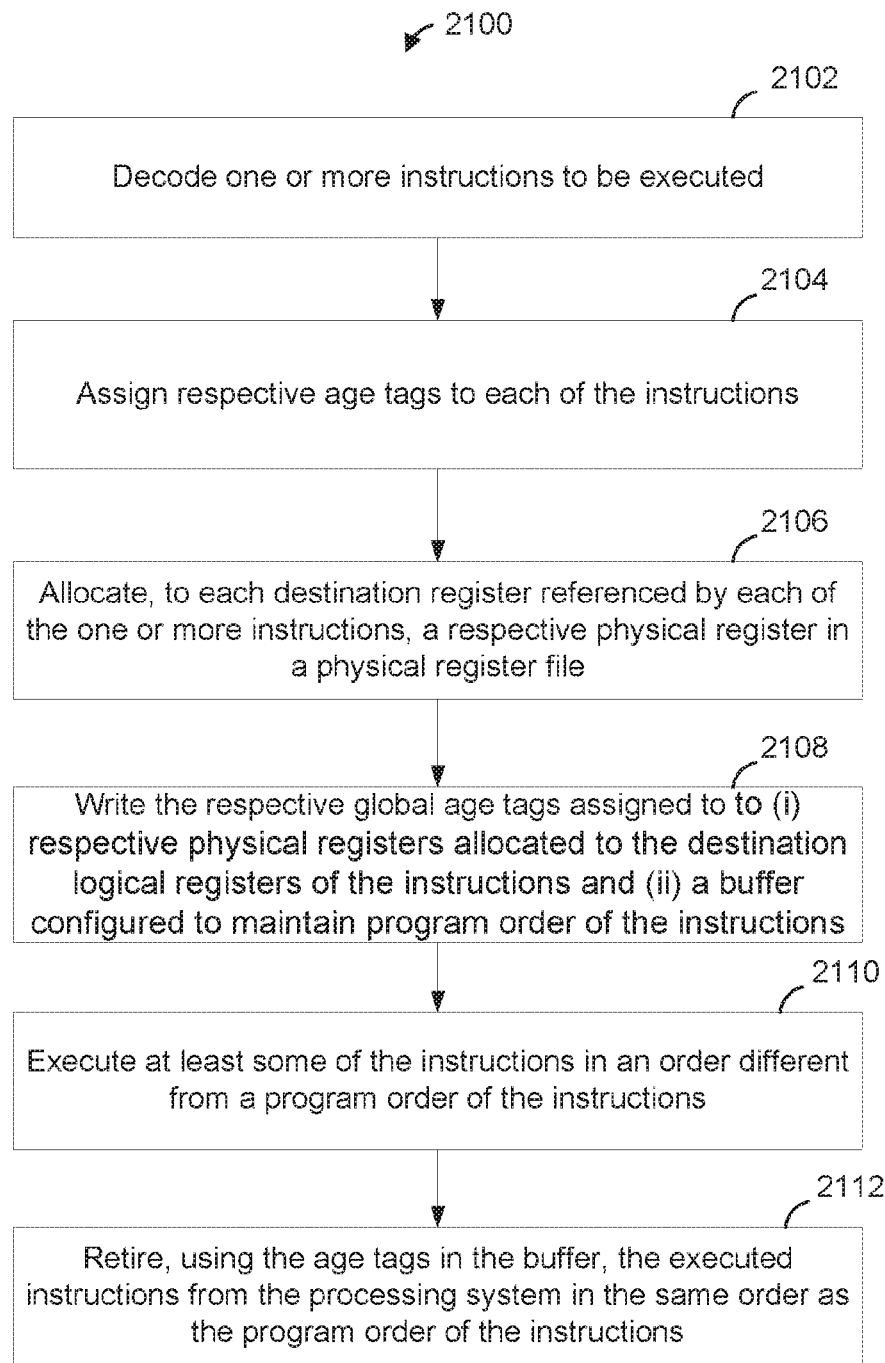
FIG. 21 is a flow diagram of an example method of executing instructions in a processing system, according to an embodiment.

FIG. 21 is a flow diagram of an example method 2100 of executing instructions in a processing system, according to an embodiment. The method 2100 is implemented by the processing system 100 of FIG. 1, in an embodiment. The method 2100 is implemented by the processing system 200 of FIG. 2, in another embodiment. The method 2100 is implemented by one of the processing system 500 of FIG. 5, the processing system 600 of FIG. 6 or the processing system. 800 of FIG. 8, in yet another embodiment. The method 2100 is implemented by other suitable processing systems, in other embodiments. Similarly, the processing system 100, 200, 500, 600 and/or 800 implement suitable methods for executing instructions other than the method 2100, in other embodiments.

At block 2102, one or more instructions to be executed by the processing system are decoded. The block 702 includes decoding one or several instructions in a single clock cycle, in various embodiments. For example, in one embodiment, in a single issue width processing system, a single instruction is decoded at block 2102 during a single clock cycle. In another embodiment, such as in a multi-instruction issue width processing system, multiple instructions are decoded at block 2102 in a single clock cycle.

At block 2104, respective age tags (e.g., global age tags) are assigned to the instructions decoded at block 2102. In an embodiment, the respective age tags assigned at block 2104 indicate respective ages of the instructions in the processing systems and, accordingly, indicate an order of the instructions in the program code being executed by the processing system.

At block 2106, respective physical registers in a physical register file (e.g., a banked physical register file) are allocated to each destination register referenced by each of the one or more instructions. For example, in an embodiment in which the register file is a banked register file that includes a plurality of register banks corresponding to a plurality of logical registers defined by instruction set architecture supported by the processing system, respective physical registers in the register banks corresponding to the logical register are allocated to the respective destination registers referenced by the one or more instructions.

At block 2108, the respective global age tags assigned to the respective instructions are written to (i) respective physical registers allocated to the destination logical registers of the instructions and (ii) a buffer configured to maintain program order of the instructions.

At block 2110, the instructions are executed. In an embodiment, block 2110 includes executing at least some of the instructions in an order different from the program order of the instructions.

At block 2112, executed instructions are retired from the processing system. In an embodiment, the age tags assigned to the instructions at block 2104 and written to the buffer at block 2108 are used to ensure that executed instructions are retired from the processing system At least some of the various units, modules, buffers, memories, blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of executing instructions in a processing system, the method comprising:
fetching one or more instructions to be executed by the processing system;
assigning respective age tags to each of the one or more instructions, wherein each of the age tags indicates an age of the corresponding instruction in the processing system;
allocating, to each destination logical register referenced by each instruction, respective physical registers in a physical register file;
writing the respective age tags assigned to the instructions to (i) respective physical registers allocated to the destination logical registers of the instructions and (ii) a buffer configured to maintain a program order of the instructions;
executing at least some of the instructions in an order different from the program order of the instructions, and
retiring, using the age tags in the buffer, the executed instructions from the processing system in a same order as the program order of the instructions.

2. The method of claim 1, wherein the physical register file is partitioned into a plurality of register banks, wherein each register bank corresponds to a respective logical register of a set of logical registers defined by an instruction set architecture supported by the processing system.

3. The method of claim 2, wherein allocating respective physical registers to each destination logical register referenced by each instruction includes mapping instances of a particular logical register referenced by the instructions to a physical register in a physical register bank corresponding to the logical register.

4. The method of claim 3, wherein each of at least some of the register banks comprises an ordered queue of registers.

5. The method of claim 4, wherein mapping a logical register to a physical register in the physical register file comprises mapping the logical register to a next register in the queue in a register bank corresponding to the logical register.

6. The method of claim 1, wherein assigning an age tag to an instruction includes associating a state field, in the buffer, with the instruction, wherein a row index and a column index of the state field indicates the age of the instruction in the processing system.

7. The method of claim 1, further comprising:
predicting a branch in a program code;
fetching a set of instructions corresponding to the predicted branch in the program code;
mapping destination logical registers of each of the one or more instructions to physical registers in the register banks corresponding to the destination logical registers;
subsequently determining that the branch has been mispredicted; and
in response to determining that the branch has been mispredicted, de-allocating the mapped physical register, wherein de-allocating the mapped physical registers includes moving respective indications of tails of one or more queues in the register file to respective memory locations immediately preceding a respective oldest instruction in the mispredicted branch.

8. The method of claim 1, further comprising selecting, from a set of instructions available for execution, an instruction to be executed next, wherein selecting the instruction comprises selecting an instruction having an oldest age tag in the set of available instructions.

9. The method of claim 3, wherein an instruction comprises a load multiple instruction that specifies a set of multiple registers to be loaded with data from consecutive locations in a memory, and wherein executing the instruction comprises writing to the specified multiple registers by writing the data in parallel to respective physical banks corresponding to the logical registers.

10. The method of claim 3, wherein an instruction comprises a store multiple instruction that specifies a set of multiple registers from which to move data to consecutive locations in a memory, and wherein executing the instruction comprises with data from consecutive locations in a memory, and wherein executing the instruction includes reading from the specified multiple registers by reading the data in parallel from respective physical banks corresponding to the logical registers.

11. A processing system, comprising
an instruction execution hardware module configured to execute instructions fetched from a memory; and
an instruction issue hardware module configured to
assign respective age tags to each of the instructions fetched from the memory, wherein each age tags indicates an age of the corresponding instruction in the processing system,
allocate, to each destination logical register referenced by each instruction, a respective physical register in a physical register file,
write the respective age tags assigned to the instructions to (i) respective physical registers allocated to the destination logical registers of the instructions and (ii) a buffer configured to maintain a program order of the instructions;
wherein the processing system is configured to
execute at least some of the instructions in an order different from the program order of the instructions, and
use the age tags in the buffer to retire instructions from the processing system in a same order as the program order of the instructions.

12. The processing system of claim 11, wherein the physical register file is partitioned into a plurality of register banks, wherein each register bank corresponds to a respective logical register of a set of logical registers defined by an instruction set architecture supported by the processing system.

13. The processing system of claim 12, wherein the instruction issue hardware module is configured to map instances of a particular logical register referenced by the instructions to a physical register in a physical register bank corresponding to the logical register.

14. The processing system of claim 13, wherein each of at least some of the register banks comprises an ordered queue of registers.

15. The processing system of claim 13, wherein the instruction issue hardware module is configured to map a logical register to a next register in the queue in a register bank corresponding to the logical register.

16. The processing system of claim 14, wherein the instruction issue hardware module is configured to assign an age tag of an instruction at least by allocating a state field in the buffer with the instruction, wherein a row index and a column index of the state field indicates the age of the instruction in the processing system.

17. The processing system of claim 14, further comprising a branch prediction unit configured to predict a branch in a program code; wherein
  the instruction issue hardware module is configured to:
    map destination logical registers of each of the one or more instructions to physical registers in the register banks corresponding to the destination logical registers; and
    subsequent to a determination that the branch was mispredicted, de-allocate the mapped physical registers at least by moving respective indications of tails of one or more queues in the register file to respective memory locations immediately preceding a respective oldest instruction in the mispredicted branch.

18. The processing system of claim 11, wherein the instruction execution hardware module is configured to select, from a set of instructions available for execution, instructions to be executed next by functional units included in the instruction execution hardware module at least by selecting an instruction having an oldest age tag in the set of available instructions.

19. The processing system of claim 13, wherein an instruction comprises a load multiple instruction that specifies a set of multiple registers to be loaded with data from consecutive locations in a memory, and wherein executing the instruction comprises writing to the specified multiple registers by writing the data in parallel to respective physical banks corresponding to the logical registers.

20. The processing system of claim 13, wherein an instruction comprises a store multiple instruction that specifies a set of multiple registers from which to move data to consecutive locations in a memory, and wherein executing the instruction includes reading from the specified multiple registers by reading the data in parallel from respective physical banks corresponding to the logical registers.

* * * * *